United States Patent
Horton et al.

(10) Patent No.: US 6,954,429 B2
(45) Date of Patent: Oct. 11, 2005

(54) BANDWIDTH CONTROL SYSTEM

(75) Inventors: James Horton, Emmaus, PA (US); Lois Hollopeter, Lehighton, PA (US); Victor Nunes, Allentown, PA (US); Scott Searcy, Fogelsville, PA (US); David Thomas, Bethlehem, PA (US)

(73) Assignee: Dyband Corporation, Ottawa (CA)

( * ) Notice: Subject to any disclaimer, the term of this patent is extended or adjusted under 35 U.S.C. 154(b) by 712 days.

(21) Appl. No.: 09/826,235

(22) Filed: Apr. 4, 2001

(65) Prior Publication Data

US 2001/0055303 A1 Dec. 27, 2001

Related U.S. Application Data

(60) Provisional application No. 60/195,000, filed on Apr. 5, 2000.

(51) Int. Cl.$^7$ .......................... G06F 11/00; H04L 12/26
(52) U.S. Cl. .................. 370/230.1; 370/235; 370/256; 370/395.4; 370/468
(58) Field of Search ............................. 370/230.1, 232, 370/235, 256, 356, 389, 395.4, 468, 229

(56) References Cited

U.S. PATENT DOCUMENTS

| | | |
|---|---|---|
| 4,769,191 A | 9/1988 | Diana |
| 4,769,811 A | 9/1988 | Eckberg, Jr. et al. |
| 5,014,260 A | 5/1991 | Wicklund |
| 5,029,164 A | 7/1991 | Goldstein et al. |
| 5,040,171 A | 8/1991 | Osaki |
| 5,042,029 A | 8/1991 | Hayakawa |
| 5,119,372 A | 6/1992 | Verbeek |
| 5,130,978 A | 7/1992 | Mobasser |
| 5,243,596 A | 9/1993 | Port et al. |
| 5,253,247 A | 10/1993 | Hirose et al. |
| 5,258,979 A | 11/1993 | Oomuro et al. |
| 5,265,091 A | 11/1993 | van Landegem |
| 5,280,470 A | 1/1994 | Buhrke et al. |
| 5,289,462 A * | 2/1994 | Ahmadi et al. ............. 370/232 |
| 5,313,454 A | 5/1994 | Bustini et al. |
| 5,317,563 A | 5/1994 | Oouchi et al. |
| 5,319,638 A | 6/1994 | Lin |
| 5,335,224 A | 8/1994 | Cole et al. |
| 5,347,511 A * | 9/1994 | Gun ........................... 370/255 |
| 5,359,593 A | 10/1994 | Derby et al. |

(Continued)

Primary Examiner—Afsar Qureshi
(74) Attorney, Agent, or Firm—Drinker Biddle & Reath LLP

(57) ABSTRACT

A bandwidth control system for a network, the network having a host computer that includes a first network interface and a second network interface. A packet driver adapted to be executed on the host computer is logically connected to the first network interface and the second network interface. The packet driver captures packets received from the network on the first network interface. A traffic shaper adapted to be executed on the host computer maintains a topology representation of the network, the topology representation including one or more nodes. The traffic shaper performs priority and packet rate metering functions on the captured packets to match a set of rate conditions unique to each node in the topology representation of the network. The captured packets are returned to the packet driver for transmission to the network on the second network interface.

19 Claims, 45 Drawing Sheets

U.S. PATENT DOCUMENTS

| | | |
|---|---|---|
| 5,377,327 A | 12/1994 | Jain et al. |
| 5,394,408 A | 2/1995 | Nishihara et al. |
| 5,400,329 A | 3/1995 | Tokura et al. |
| 5,414,697 A | 5/1995 | Osaki |
| 5,420,859 A | 5/1995 | Takase et al. |
| 5,432,824 A | 7/1995 | Zheng et al. |
| 5,446,726 A | 8/1995 | Rostoker et al. |
| 5,457,687 A | 10/1995 | Newman |
| 5,479,404 A | 12/1995 | Francois et al. |
| 5,519,689 A | 5/1996 | Kim |
| 5,550,808 A | 8/1996 | Shimokoshi |
| 5,592,470 A | 1/1997 | Rudrapatna et al. |
| 5,640,389 A | 6/1997 | Masaki et al. |
| 5,671,216 A | 9/1997 | Subasingha et al. |
| 5,694,390 A | 12/1997 | Yamaato et al. |
| 5,734,825 A | 3/1998 | Lauck et al. |
| 5,784,358 A | 7/1998 | Smith et al. |
| 5,805,599 A | 9/1998 | Mishra et al. |
| 5,835,484 A | 11/1998 | Yamato et al. |
| 5,838,663 A | 11/1998 | Elwalid et al. |
| 5,838,681 A | 11/1998 | Bonomi et al. |
| 5,881,140 A | 3/1999 | Gerault et al. |
| 5,889,956 A | 3/1999 | Hauser et al. |
| 5,901,147 A | 5/1999 | Joffe |
| 5,917,805 A | 6/1999 | Manning et al. |
| 5,946,324 A | 8/1999 | Mishra et al. |
| 5,949,758 A | 9/1999 | Kober |
| 5,956,338 A | 9/1999 | Ghaibeh |
| 5,970,048 A | 10/1999 | Pajuvirta et al. |
| 5,974,033 A | 10/1999 | Kamiya et al. |
| 5,978,356 A | 11/1999 | Elwalid et al. |
| 5,983,261 A | 11/1999 | Riddle |
| 6,032,193 A | 2/2000 | Sullivan |
| 6,118,791 A * | 9/2000 | Fichou et al. ............... 370/468 |
| 6,137,777 A * | 10/2000 | Vaid et al. .................. 370/230 |
| 6,647,008 B1 * | 11/2003 | Galand et al. ............. 370/389 |
| 2002/0087713 A1 * | 7/2002 | Cunningham ............... 709/235 |

\* cited by examiner

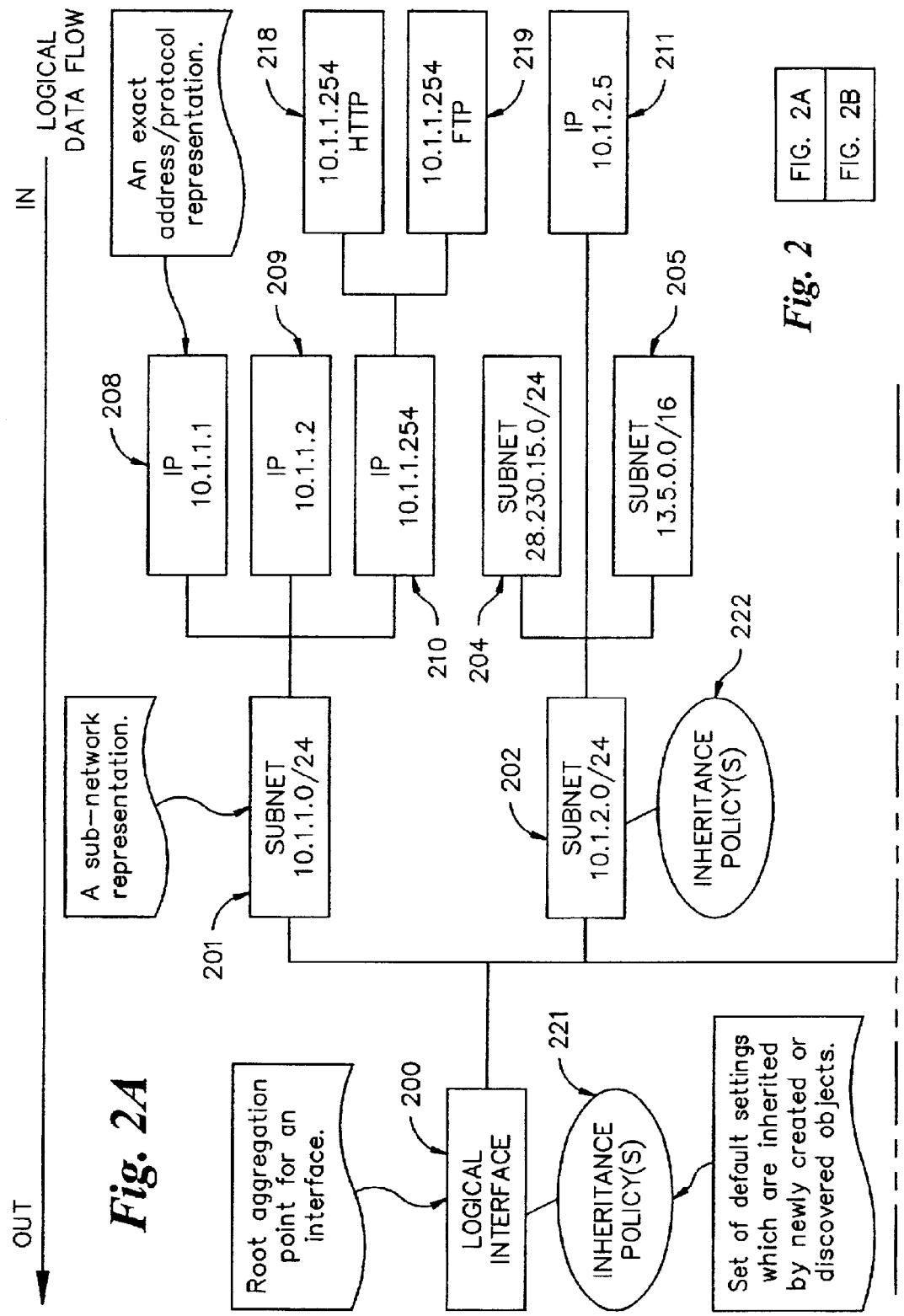

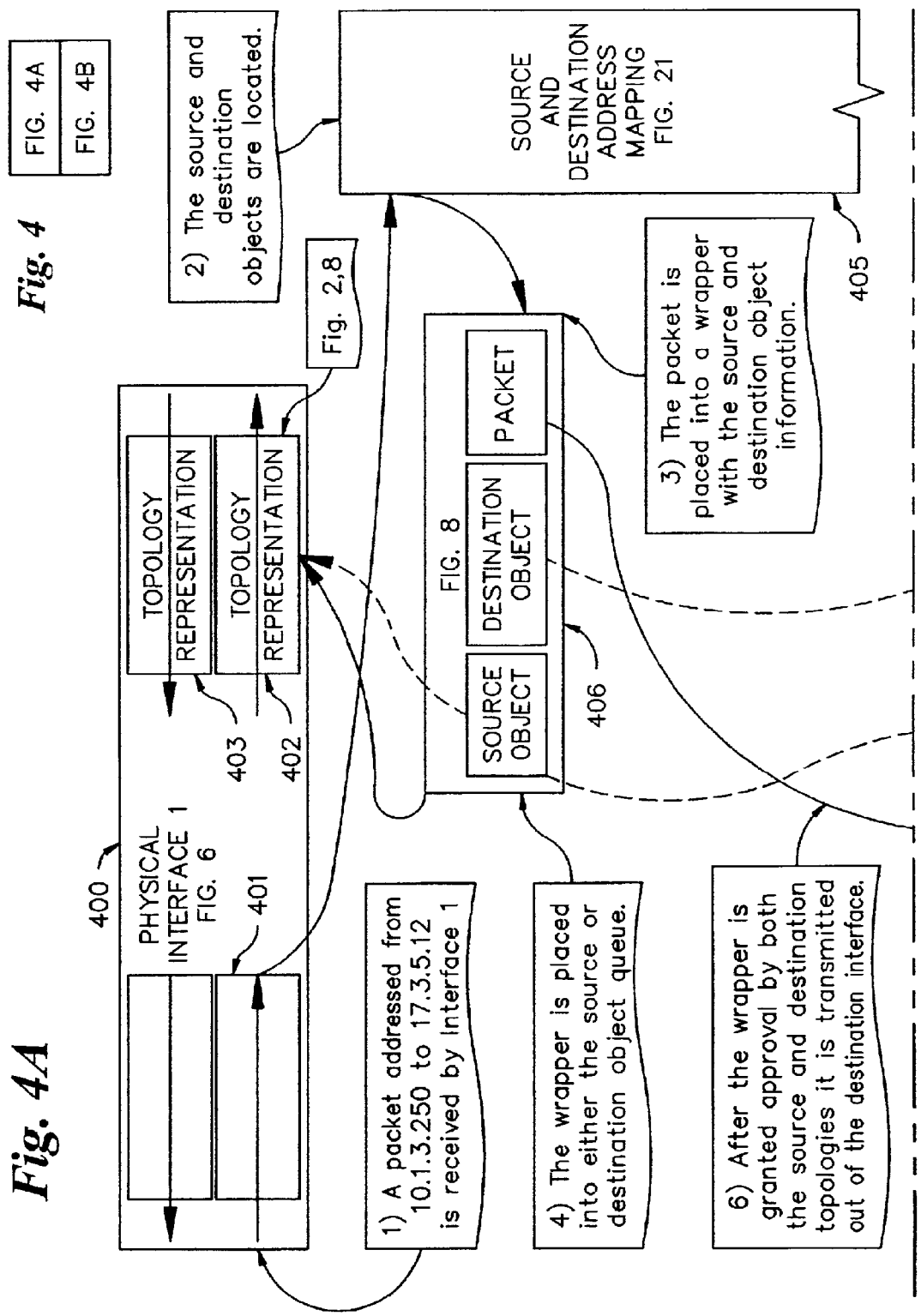

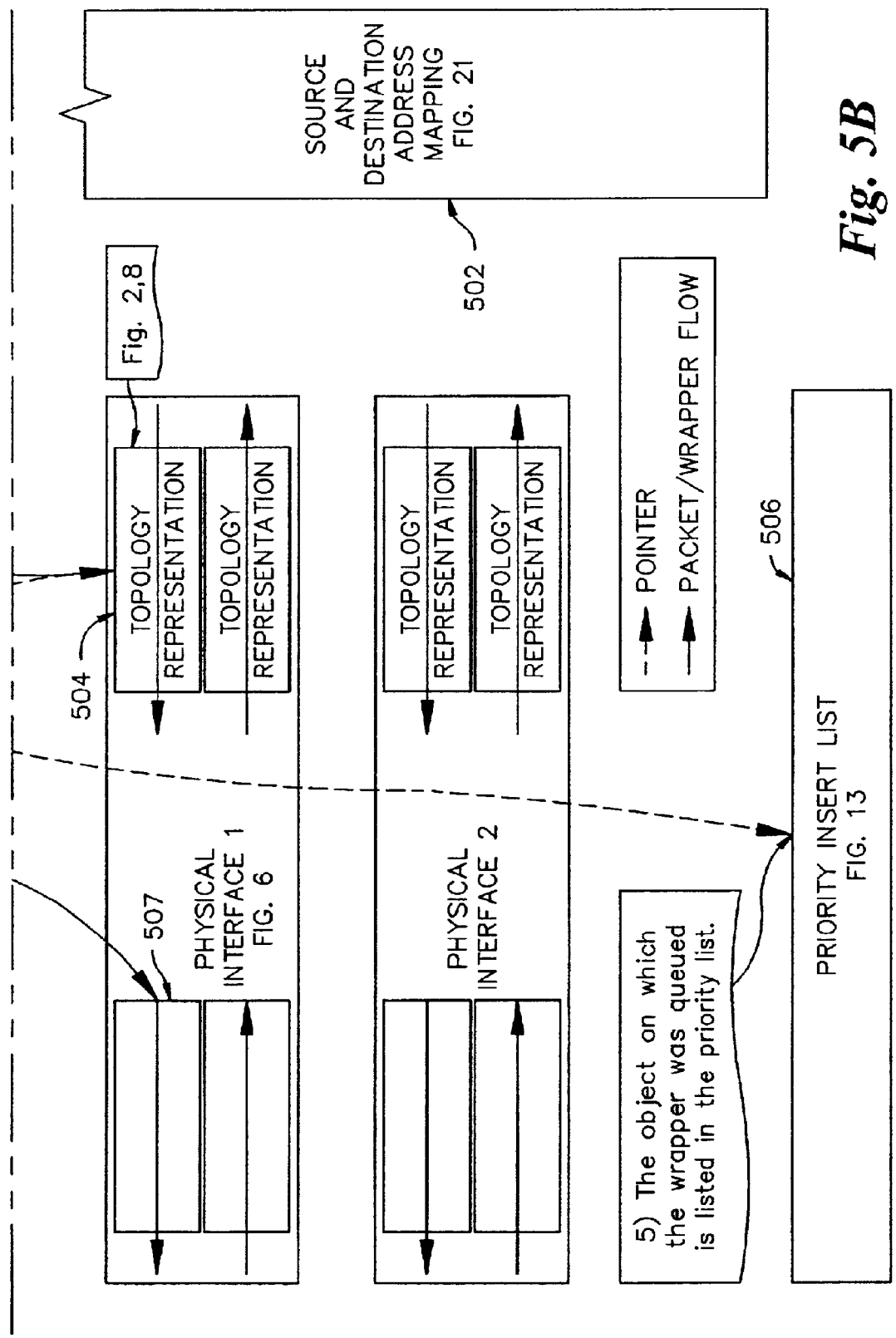

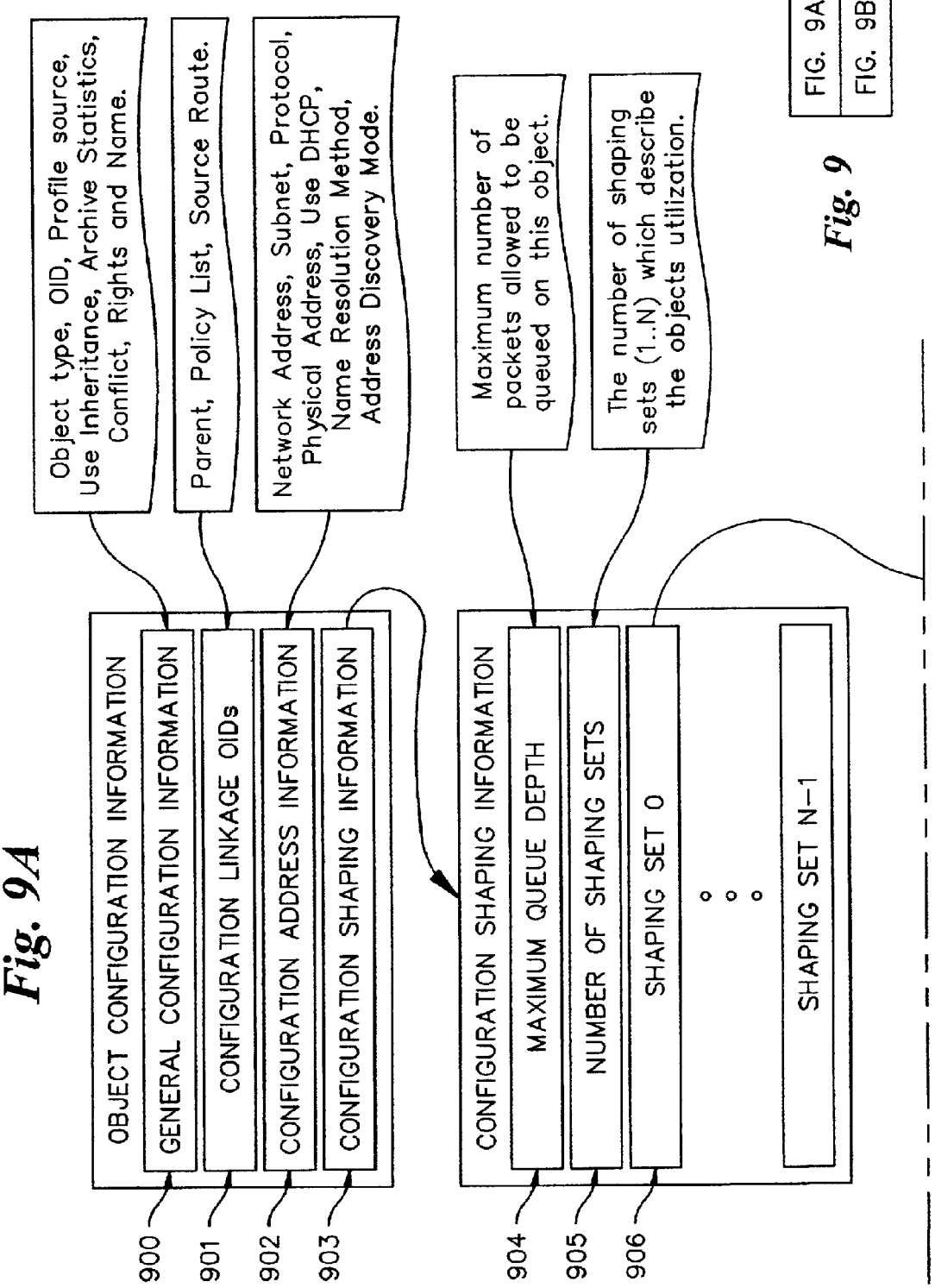

| FIG. 13A |
|----------|
| FIG. 13B |

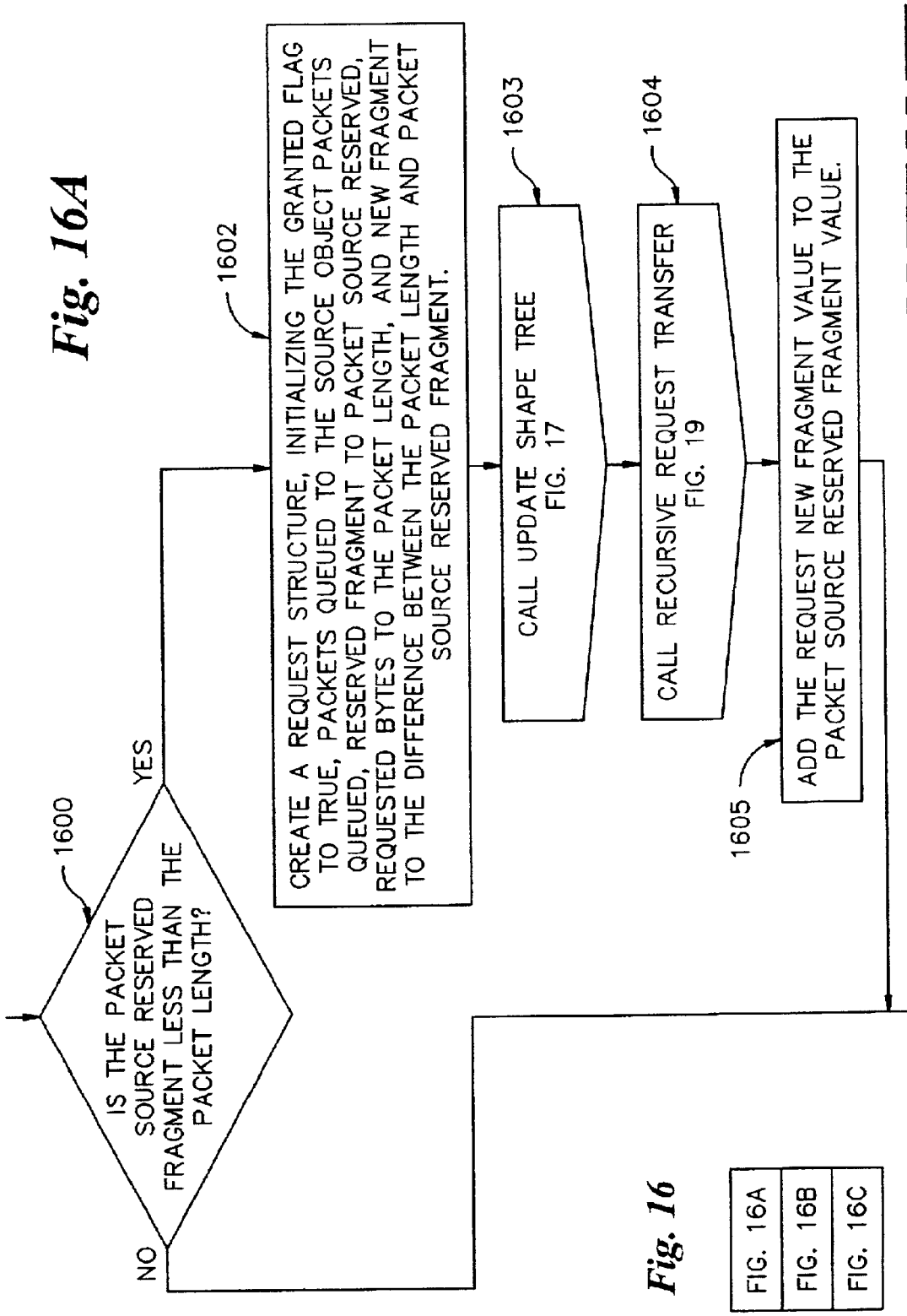

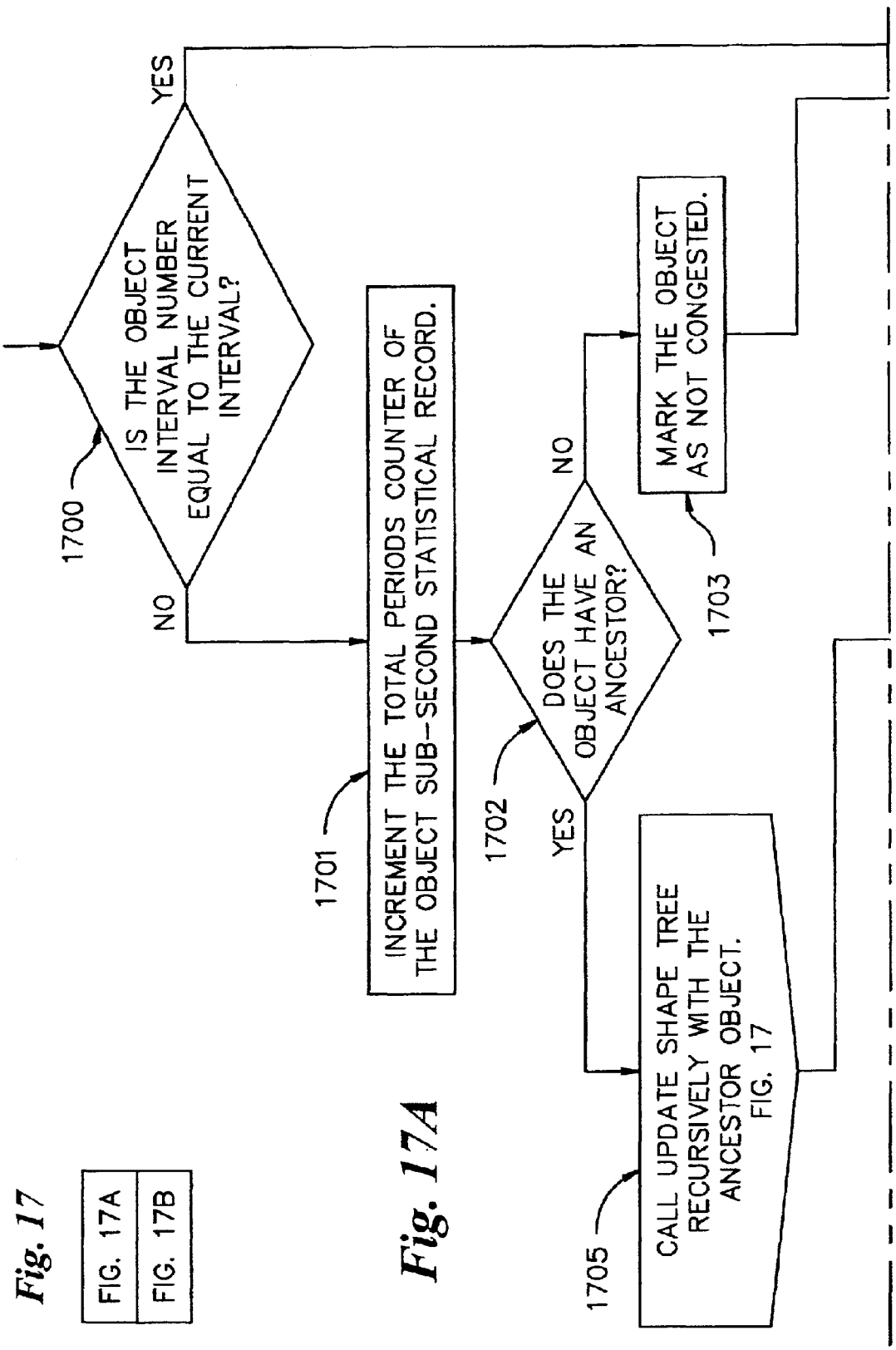

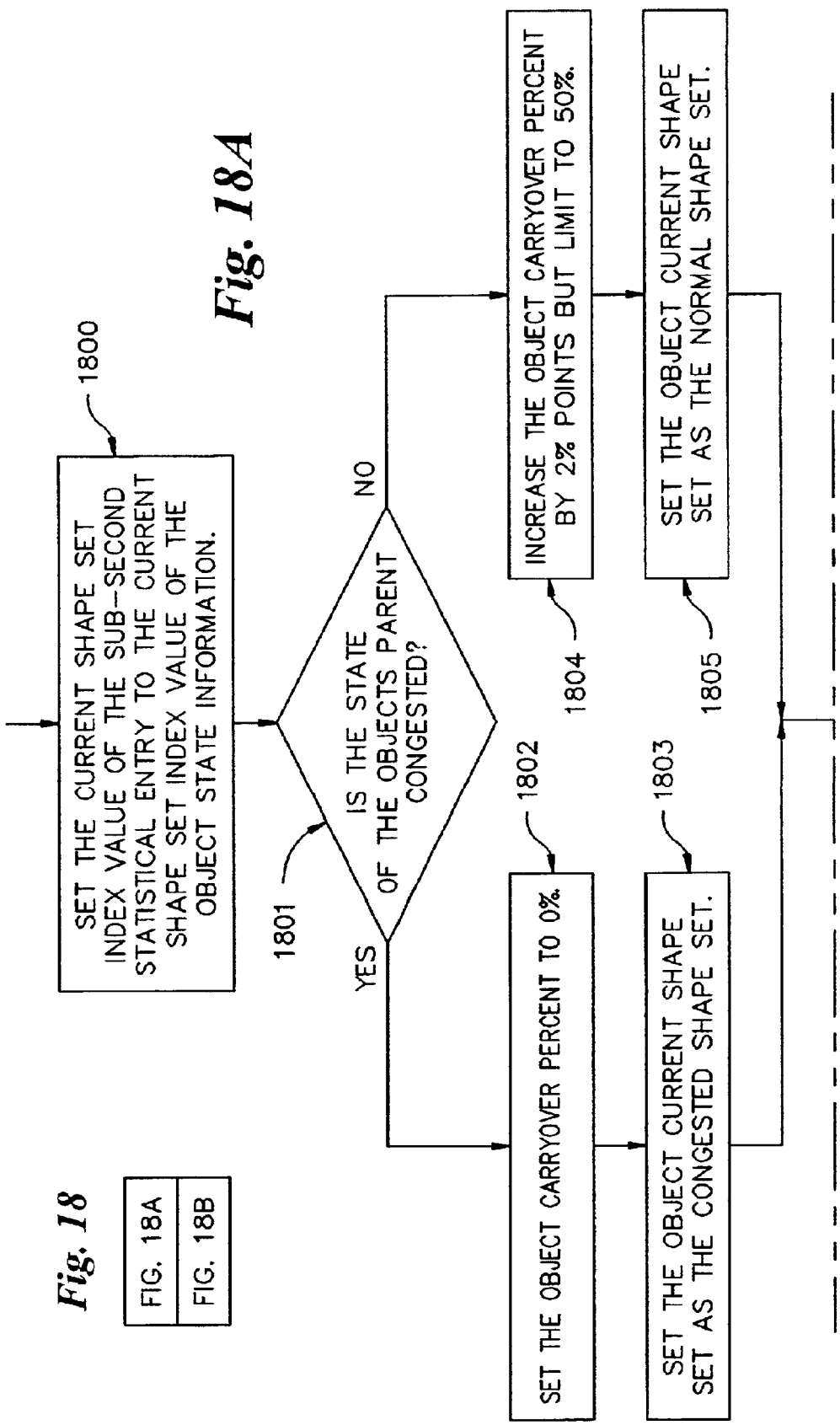

| FIG. 20A |
| FIG. 20B |
| FIG. 20C |

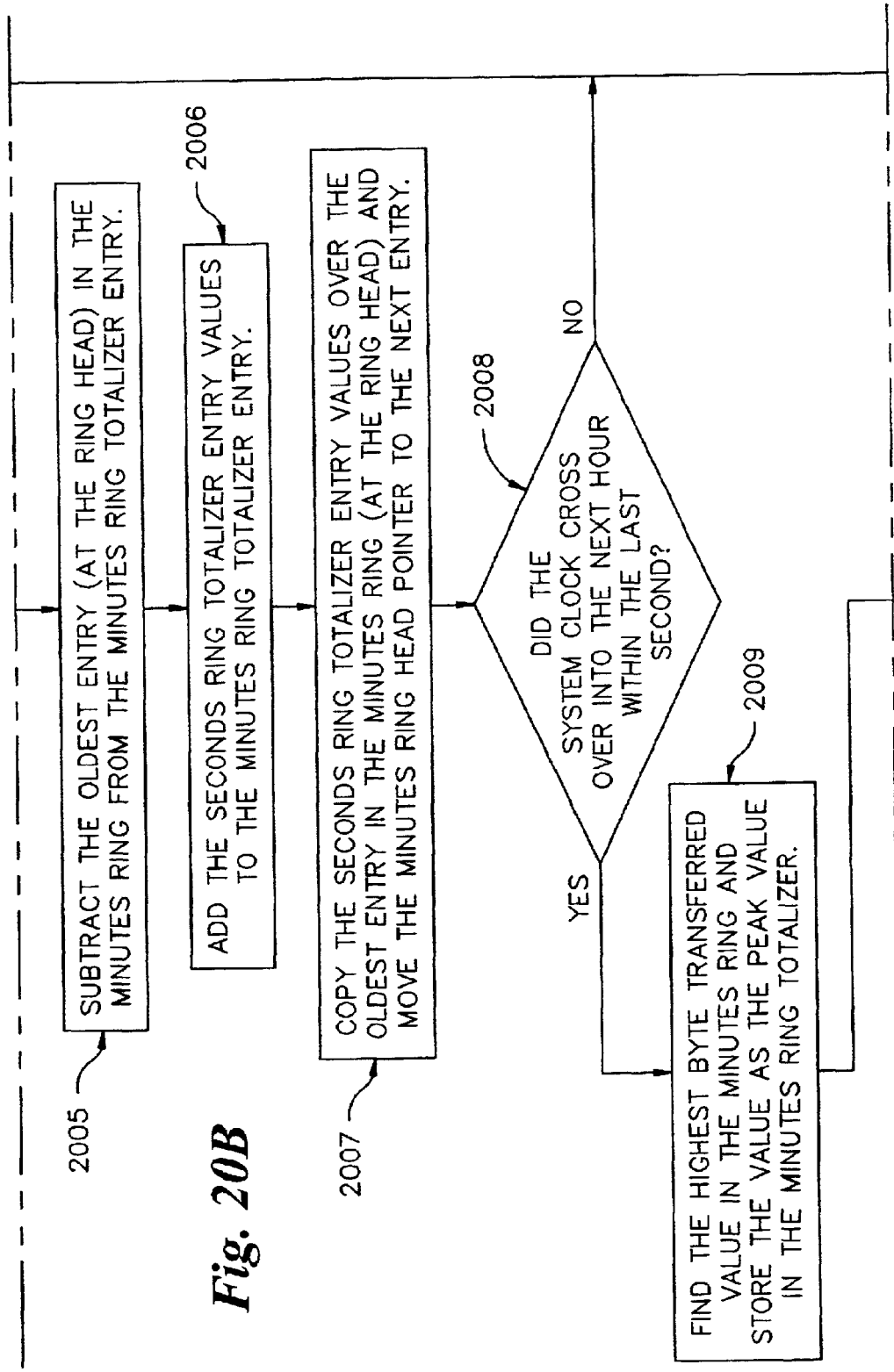

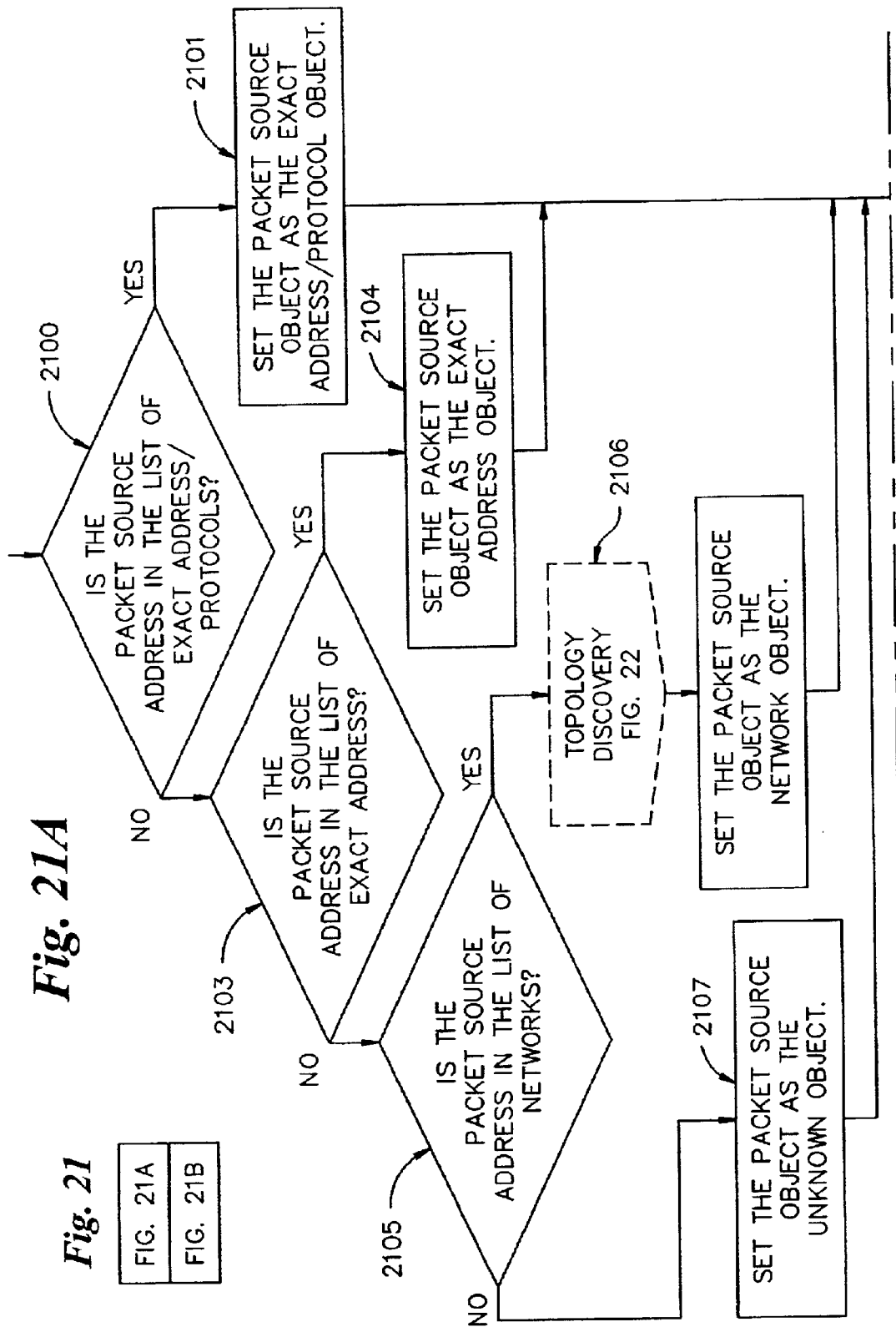

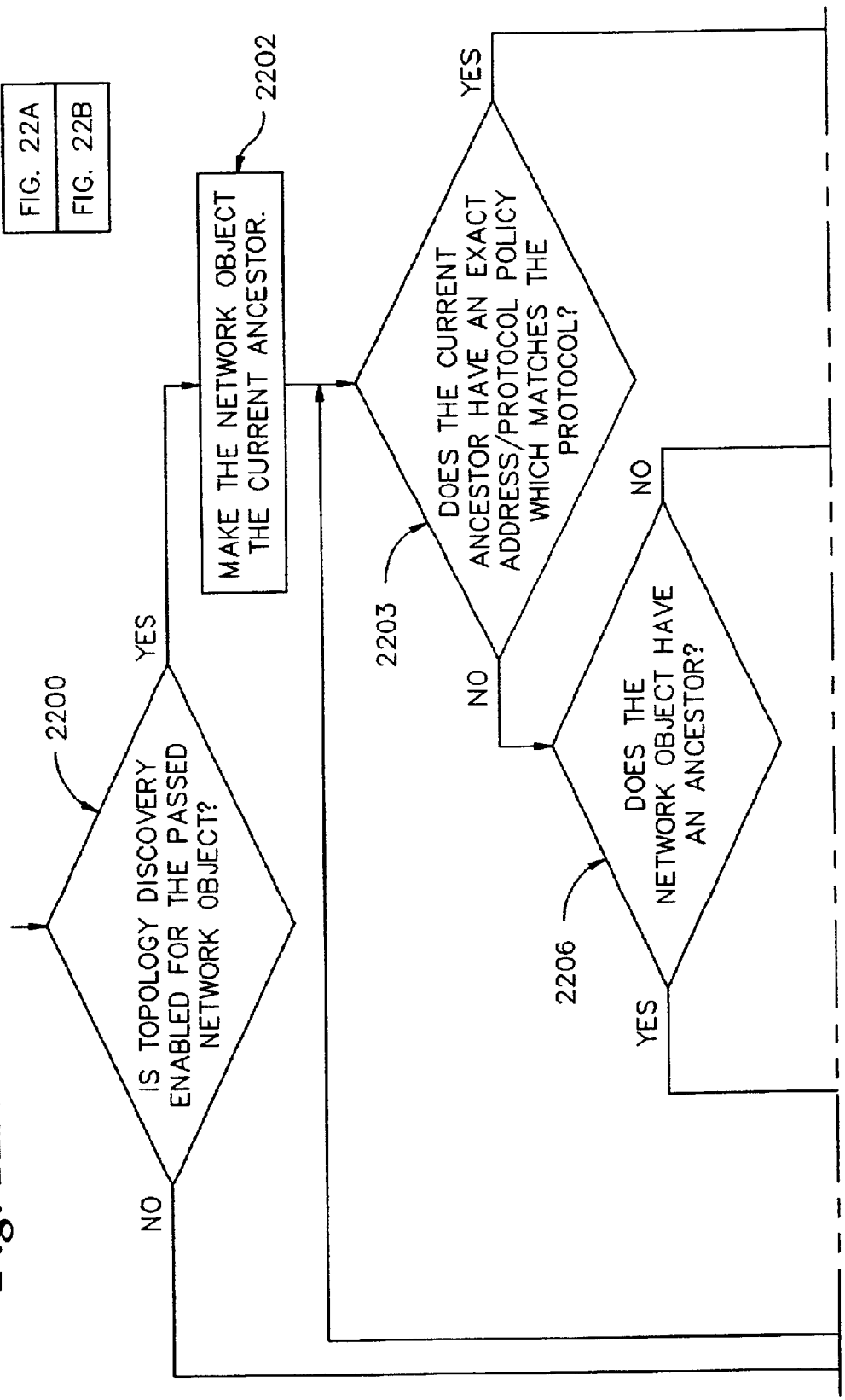

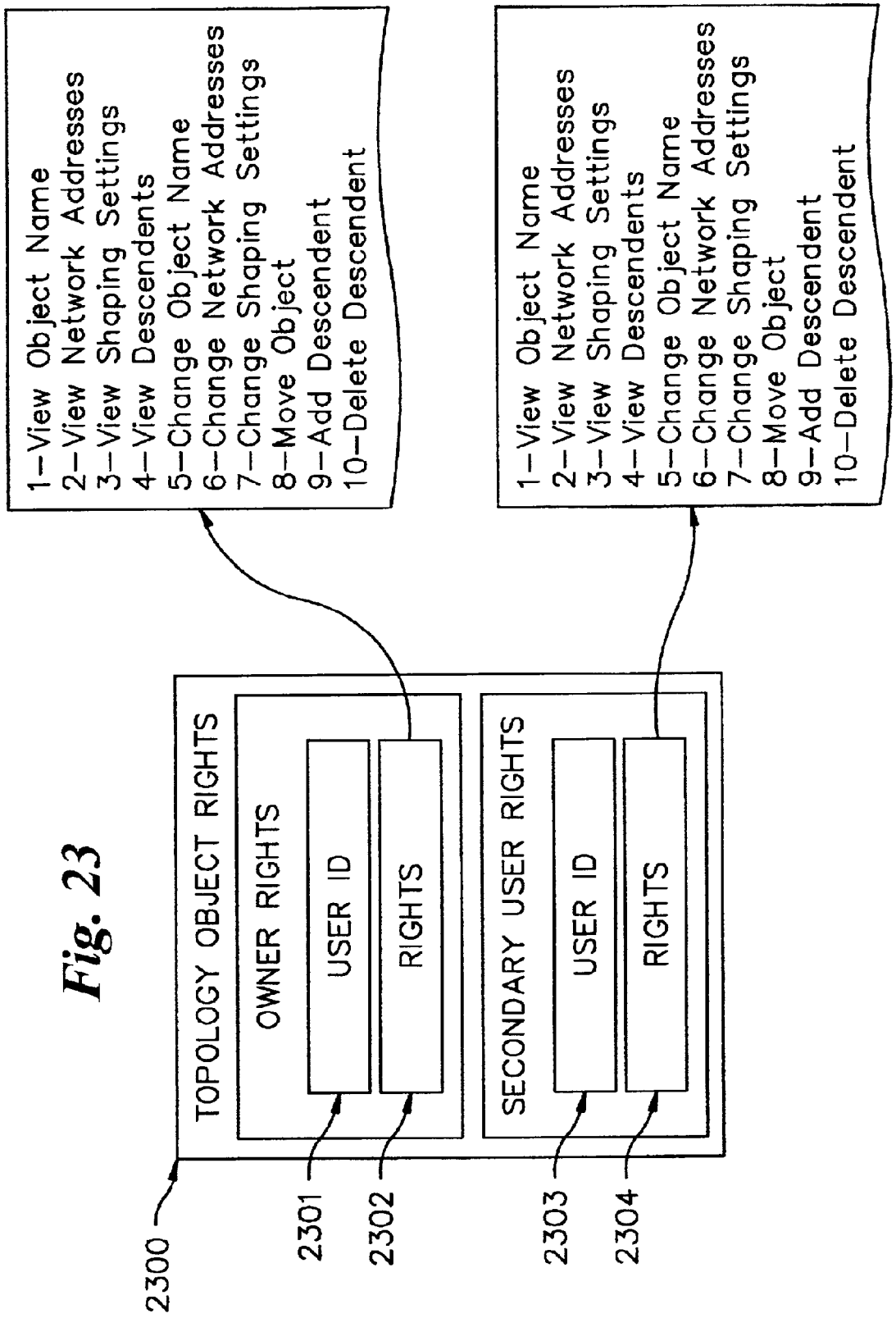

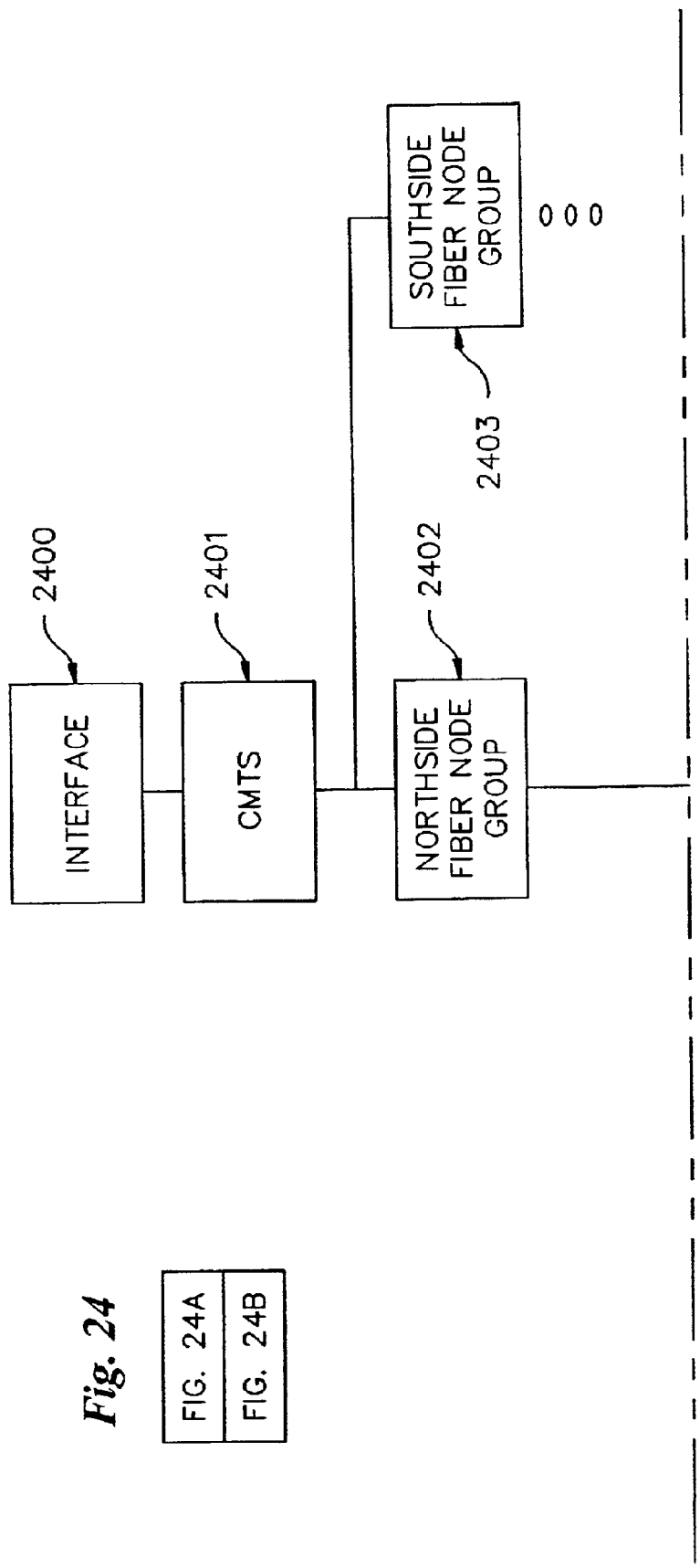

BANDWIDTH CONTROL SYSTEM

CROSS REFERENCE TO RELATED APPLICATIONS

The present application is based on and claims the benefit of U.S. Provisional Application No. 60/195,000, filed Apr. 5, 2000, entitled "BANDWIDTH CONTROL SYSTEM," which is herein incorporated by reference in its entirety.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention relates generally to a bandwidth control system for networks, and more particularly to a system in which network traffic that flows through the system is prioritized and shaped to match a set of rate conditions unique to each of a hierarchy of arbitrary physical and logical aggregation points (nodes) that form a logical representation of a network and its underlying physical elements.

Quality of service (QoS) technology is critical in modern multi-service networks, both to provide needed performance to applications with particular bandwidth and latency demands, and to assist in the construction of Service Level Agreements for network cost allocation. Such technology is particularly important in networks such as TCP/IP networks that are characterized by traffic that is inherently bursty and unpredictable. Moreover, the need for QoS technology will only continue to increase as the growth of network traffic, both through the public Internet and private LANs and WANs, continues at a rapid pace.

Existing bandwidth control systems are based on various queuing algorithms such as class-based queuing (CBQ). In CBQ, traffic flows are classified with multiple attributes, each class is assigned an average data rate and bandwidth is distributed in real-time as it becomes available. Algorithms such as CBQ, however, are disadvantageous in that they are predictive in nature. Bandwidth is assigned by scheduling packets based on the system's estimate of the current load and the current rate of usage of the nodes throughout the network. Such estimates are inaccurate due to the burstiness and unpredictability of network traffic, leading to inefficient packet scheduling and the possibility of network congestion.

Algorithms such as CBQ are also disadvantageous in needing to keep fairly accurate information regarding the load and usage rates of all nodes throughout a network. This requirement makes it very difficult to scale a CBQ system as the number of network users or the complexity of the network increases. First, the computational complexity of scheduling packets increases every time users or network nodes are added. Moreover, it becomes increasingly difficult to gather load and usage information from all nodes as the number of users or network complexity increases. For example, not all nodes may respond to requests for load/rate information within a required time period. Thus, the effectiveness of CBQ systems greatly diminishes as networks scale in size and complexity.

There is a need in the art for a bandwidth control system that can dynamically manage bandwidth consumption without the need of predictive packet scheduling. There is also a need for a bandwidth control system that scale with increases in network users or network complexity without increased computational complexity or loss of performance.

SUMMARY OF THE INVENTION

Briefly stated, the present invention provides a bandwidth control system for a network, the network having a host computer that includes a first network interface and a second network interface. The bandwidth control system comprising a packet driver and a traffic shaper. The packet driver is adapted to be executed on the host computer and is logically connected to the first network interface and the second network interface. The packet driver captures packets received from the network on the first network interface. The traffic shaper is adapted to be executed on the host computer and maintains a topology representation of the network, the topology representation including one or more nodes. The traffic shaper performs priority and packet rate metering functions on the captured packets to match a set of rate conditions unique to each node in the topology representation of the network. The packet shaper returns the captured packets to the packet driver for transmission to the network on the second network interface.

In another embodiment, the present invention provides a method of managing bandwidth in a network, the network having a host computer that includes a first network interface and a second network interface. In the method, a topology representation of the network is constructed, the topology representation including one or more nodes. Packets are received from the network on the first network interface. The received packets are prioritized and shaped to match a set of rate conditions unique to each node in the topology representation of the network. The prioritized and shaped packets are transmitted to the network on the second network interface.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings, like numerals are used to indicate like elements throughout. In the drawings:

FIG. 23 is a block diagram of additional configuration information that describes a topology object in a bandwidth control system according to the present invention;

DETAILED DESCRIPTION OF THE INVENTION

Certain terminology is used herein for convenience only and is not to be taken as a limitation on the present invention.

Figure 1:
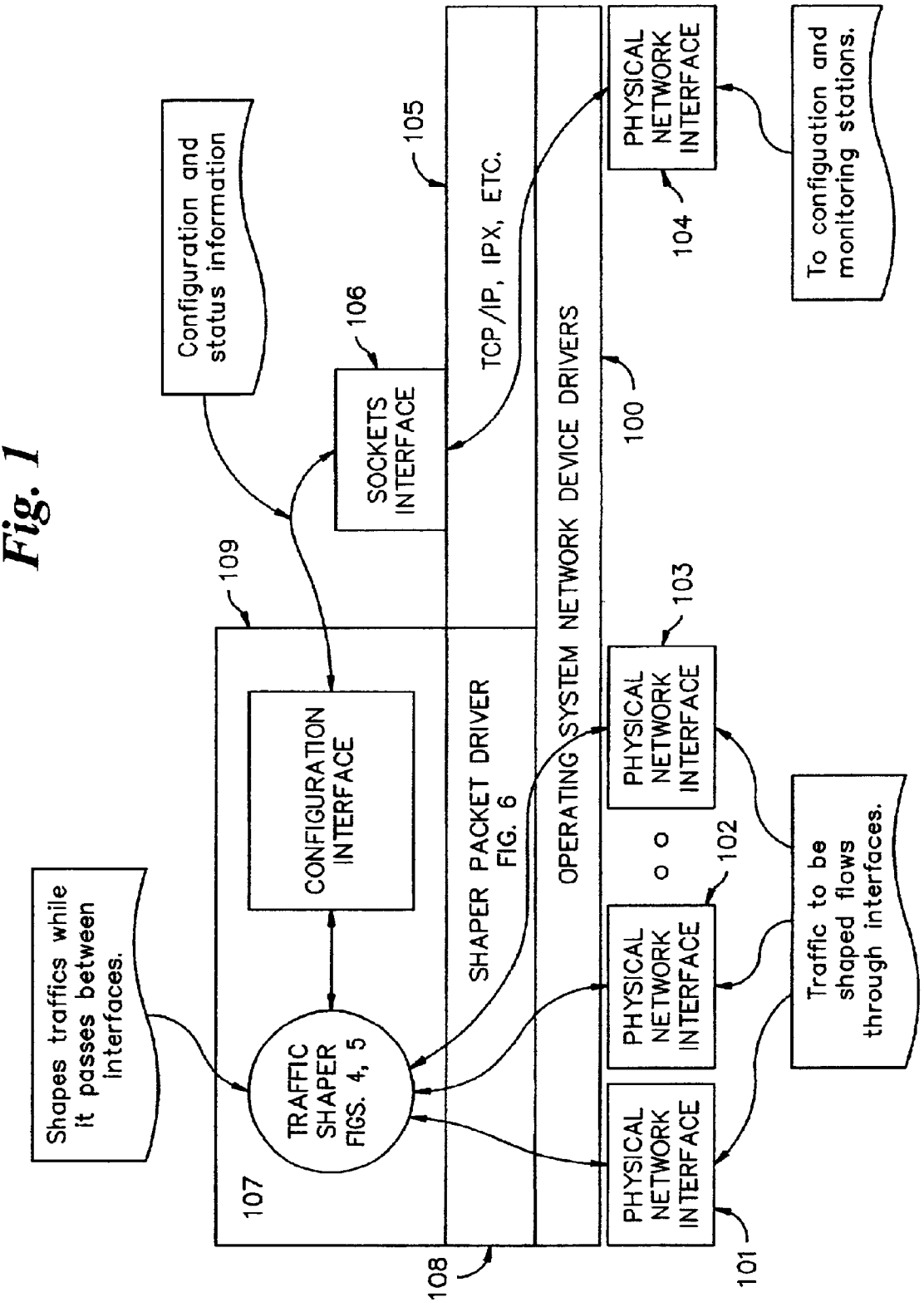
FIG. 1 is a block diagram of a bandwidth control system according to the present invention.

Referring to FIG. 1, a preferred embodiment of the bandwidth control system includes a host operating system and network device drivers 100 connecting to physical network adapters 101, 102, 103, 104, a network protocol stack 105 and Unix style sockets layer 106, all of which are generally provided within a host operating system such as Unix, Linux, Sun Solaris, or Microsoft NT.

The preferred embodiment of the present invention adds a traffic shaper 107, a packet driver 108, and a configuration interface 109 to the host operating system resources 100 through 106 described above.

In the preferred embodiment described, the TCP/IP network protocol and an Ethernet physical medium were chosen as an example, although other network protocols and physical network types may be easily implemented by one skilled in the art without departing from the spirit and scope of the present invention.

The packet driver 108 is logically connected to two or more network interfaces 101, 102, 103 that are operating in a promiscuous mode, while network interface 104 is generally operating in a non-promiscuous mode. There should be no additional routes between the networks to which the network interfaces 101, 102, and 103 attach, other than through the network interfaces 101, 102, or 103. For example, the only network route from a host on network 101 to reach a host on network 103 is via the traffic shaper 107.

Packets received on the network interfaces 101, 102, and 103 are captured by the packet driver 108 and presented to the traffic shaper 107. The traffic shaper 107 examines the source and destination addresses of the packet, pairs the packet with shaping objects within a topology representation within the shaper, performs priority and packet rate metering functions, and then returns the packet to the packet driver for transmission through an interface other than the one on which it was received.

The configuration interface 109, via the sockets interface 106, the protocol stack 105, and the network interface 104, is used to specify the operating parameters and network topology descriptions to the shaper 107 and provide interactive information containing both operational and statistical information concerning the shaper 107 and its various topology objects.

Referring to FIGS. 1, 2, 3, and 4, each physical interface system 400 for which traffic shaping is desired has discrete topology representations for both directions of traffic flow: inbound traffic 402 and outbound traffic 403. For clarity, the topology representation for each direction of traffic flow in this description is identical, but they contain independent objects for each direction of flow: inbound (towards a host) and outbound (from a host) through the topology representation. One skilled in the art will readily see that completely different topology representations may be created for each direction of traffic flow through an interface by simply specifying a different organization of objects for each direction on an interface, allowing support for asymmetrical networking environments such as CATV hybrid fiber coax, Telco-return type cable modems, wireless systems, or other networking topologies. For example, in a cable HFC data system, all client systems may use a single shared downstream-only trunk but be divided into multiple shared low-speed return paths. This form of asymmetrical topology is easily rendered by the present invention. Furthermore, the bandwidth control system of the present invention facilitates independent directional controls to shape the traffic flow for each point in the topology representation.

Figure 2B:
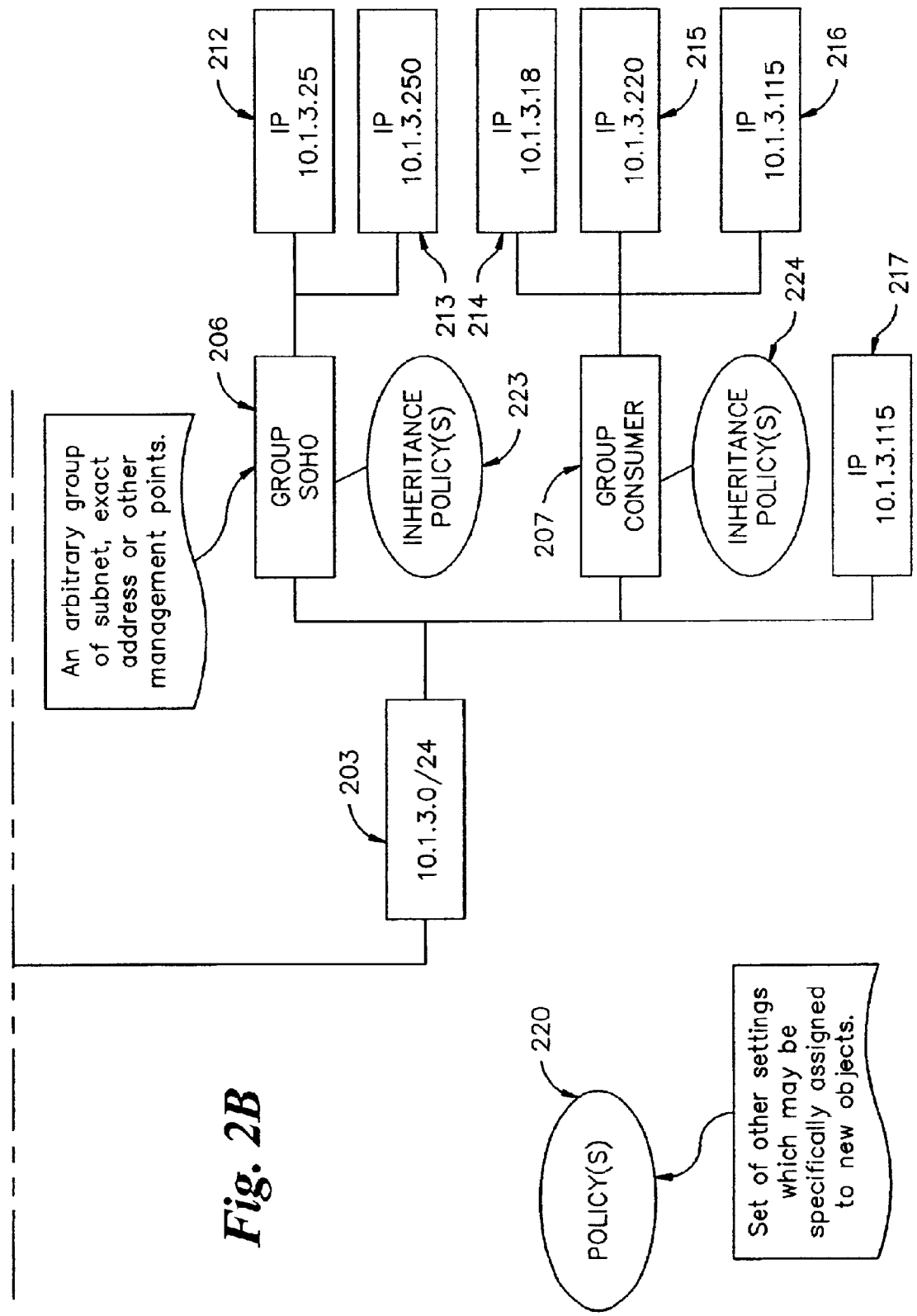
FIG. 2 is a block diagram of typical hierarchical topology created by a bandwidth control system according to the present invention.

Referring to FIG. 2, for each physical interface 400, the shaper 107 is provided with a topology representation consisting of a collection of objects organized in a hierarchical tree which represent logical or physical points of network traffic aggregation. Among these are objects of the following types: a single mandatory interface object 200, zero or more subnet objects 201 through 205, zero or more group objects 206, 207, zero or more IP objects 208 through 217, and zero or more application objects 218, 219. Additional abstract object types that represent unique logical or physical network elements such as routers or gateways may be optionally included. There are no rules for the organization of the topology representation other than that a single interface must exist and it must be located as the topmost element of the representation.

The logical interface 200 is the root point of the physical traffic aggregation for a topology representation. Subnets such as 201, 202, 203, 204, and 205 represent collections of contiguous portions of the network address space; in TCP/IP these would be CIDR (classless inter-domain routing) subnets. Groups such as 206 and 207 are arbitrary collections of other object types that may include any type other than an interface. IP objects such as 208 through 217 are objects that represent exact network IP addresses. Application objects such as 218 and 219 represent host applications such as HTTP 218 and FTP 219 being utilized by a host at IP 210.

The preferred embodiment of the bandwidth control system maintains settings or policies 220, which may be assigned to various points in the topology representation 221 through 224 which are inherited by descendants of the object to which the policies are attached. An inheritance policy such as 222 may contain default policies for multiple objects of any type and may be optionally organized as a hierarchical tree modeling a branch of the topology representation.

Figure 4B:
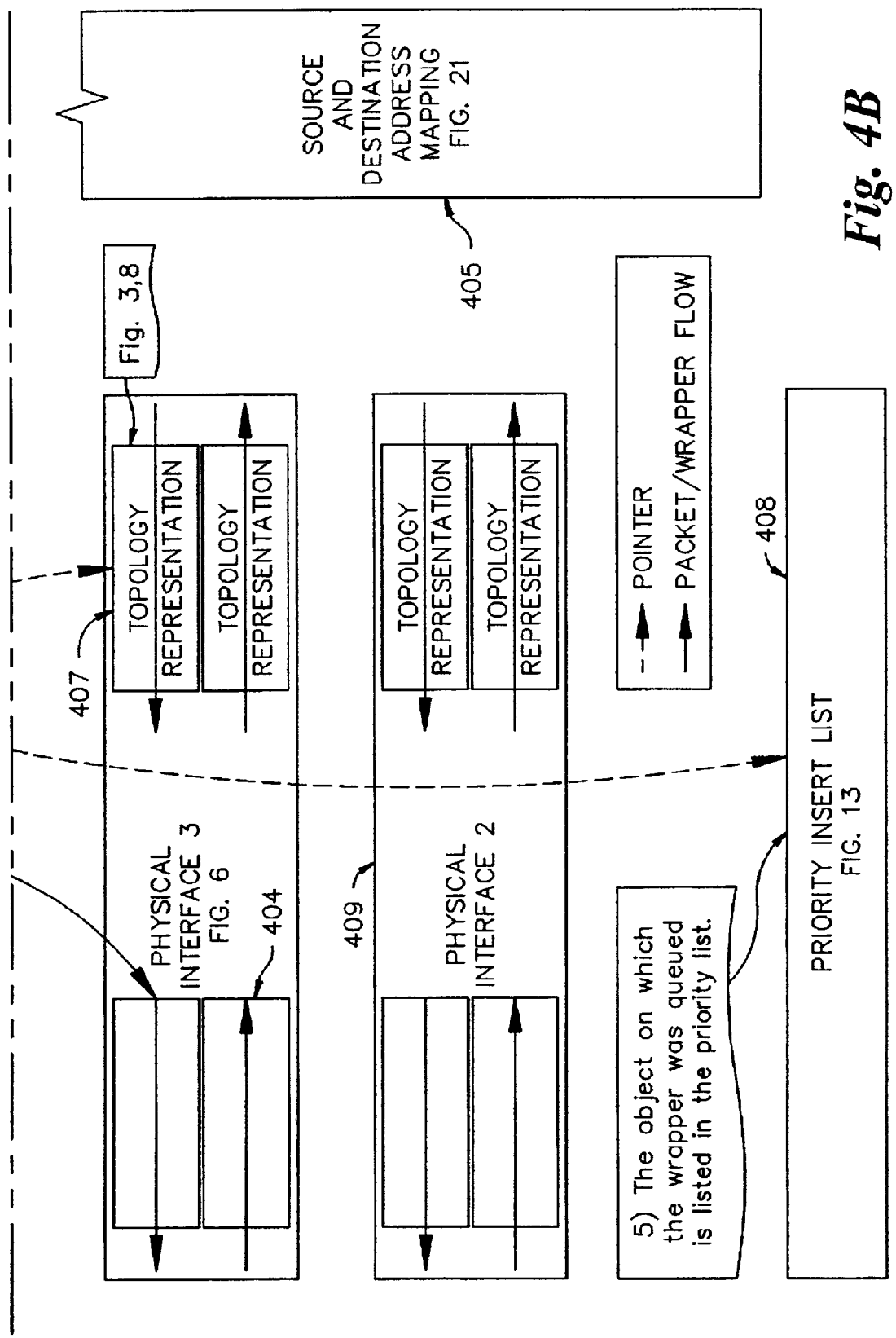
FIG. 4 is a block diagram showing a flow of packets through a bandwidth control system according to the present invention.
Figure 6:
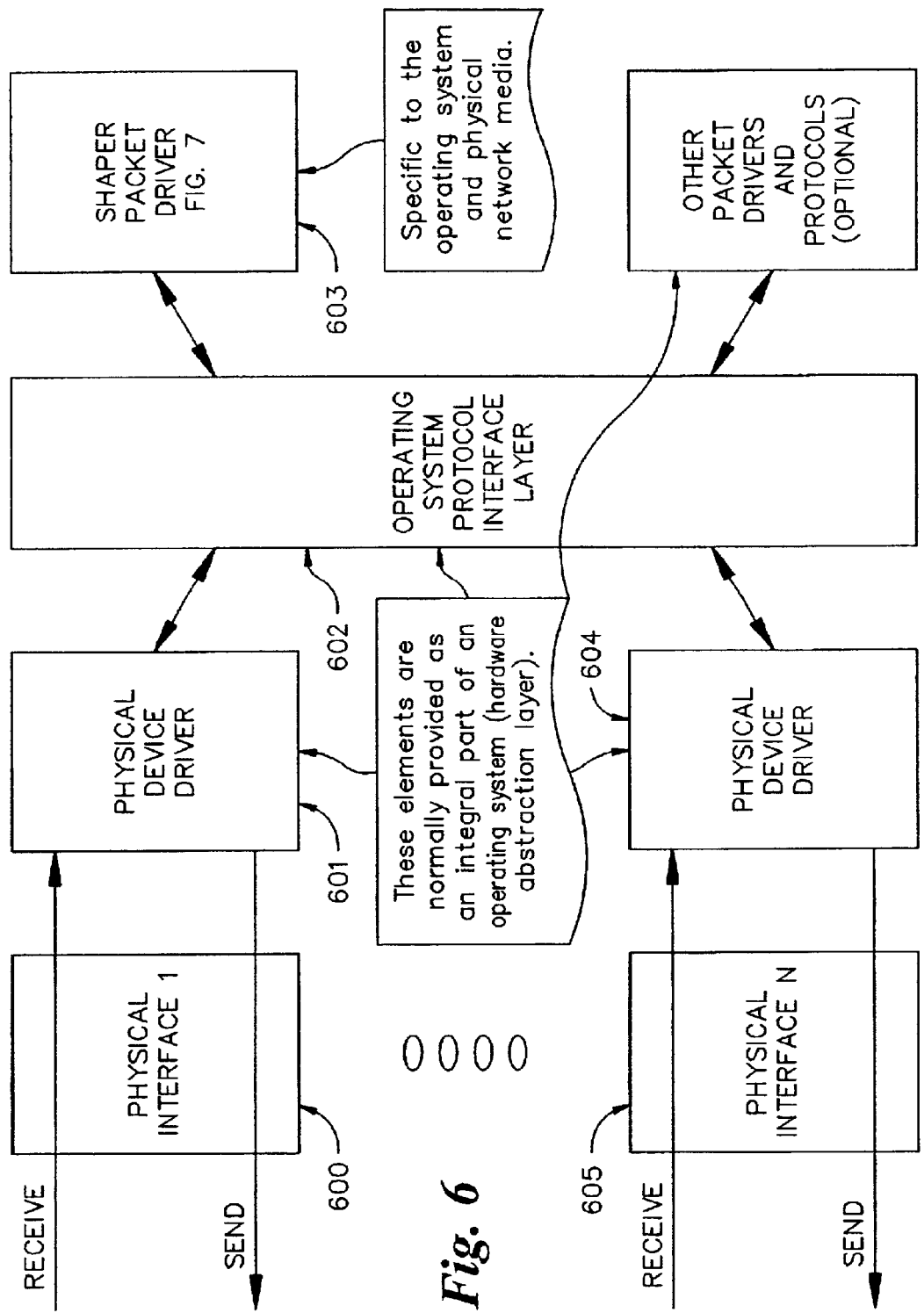
FIG. 6 is a block diagram of a packet driver for a bandwidth control system according to the present invention.

Referring to FIGS. 4 and 6, an example of traffic flow through the preferred embodiment of the bandwidth control system is provided. A host reachable through the network connected to physical interface #1 401 with IP address 10.1.3.250 has transmitted a packet to a host on interface #3 404 with IP address 17.3.5.12. The packet from source 10.1.3.250 is received by the physical network adapter 600, controlled by driver software 601, and relayed to the operating system protocol interface layer 602. The physical network adapter 600 and the driver software 601 are normally provided by a hardware manufacturer, and the operating system protocol interface layer 602 is normally an integral part of an off-the-shelf network operating system. The packet driver 603 is notified by the operating system protocol interface layer 602 of incoming packets.

Figure 7:
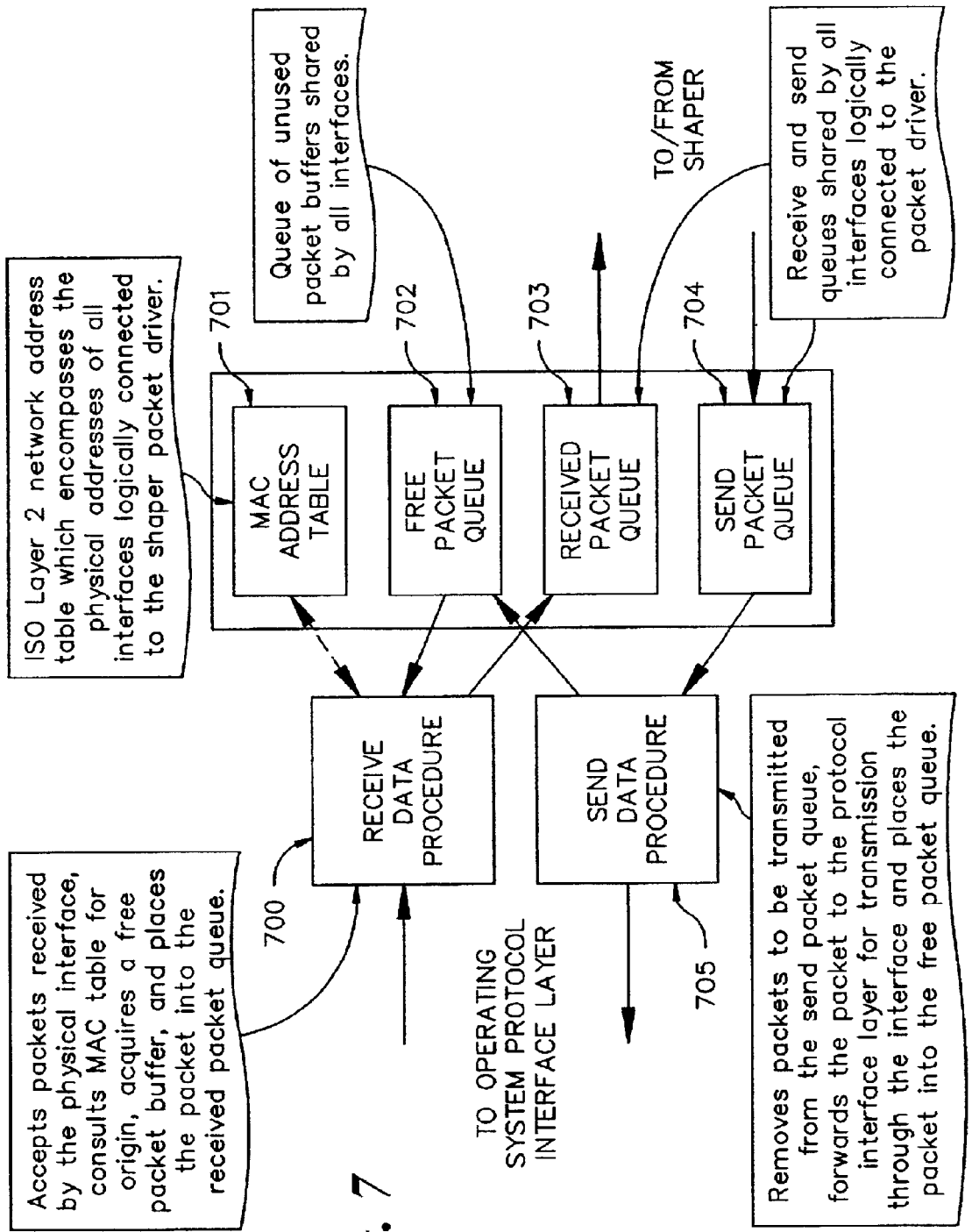
FIG. 7 is a block diagram of the internal structure of a packet driver for a bandwidth control system according to the present invention.

Referring to FIG. 7, the packet driver inspects the packet provided to it by the operating system protocol interface layer 602, determining the source and destination physical addresses (MAC, ISO layer 2). The MAC address table 701 contains a learned list of MAC addresses and interface numbers that uniquely identifies each MAC address as existing on a single interface. If the source MAC address is found to exist on an interface other than the one on which it is received, or the destination MAC address is found to exist on the same interface on which it is received, the packet provided by the operating system protocol interface layer 602 is silently ignored, and no further processing is performed on the packet. Otherwise, the source MAC address is added to MAC address table 701 as belonging to the interface on which it was received, and a new packet is obtained from a free packet queue 702. The packet provided by the operating system protocol interface layer 602 is copied into the new packet, which is then placed into a received packet queue 703 for later retrieval by the traffic shaper 107.

Figure 3:
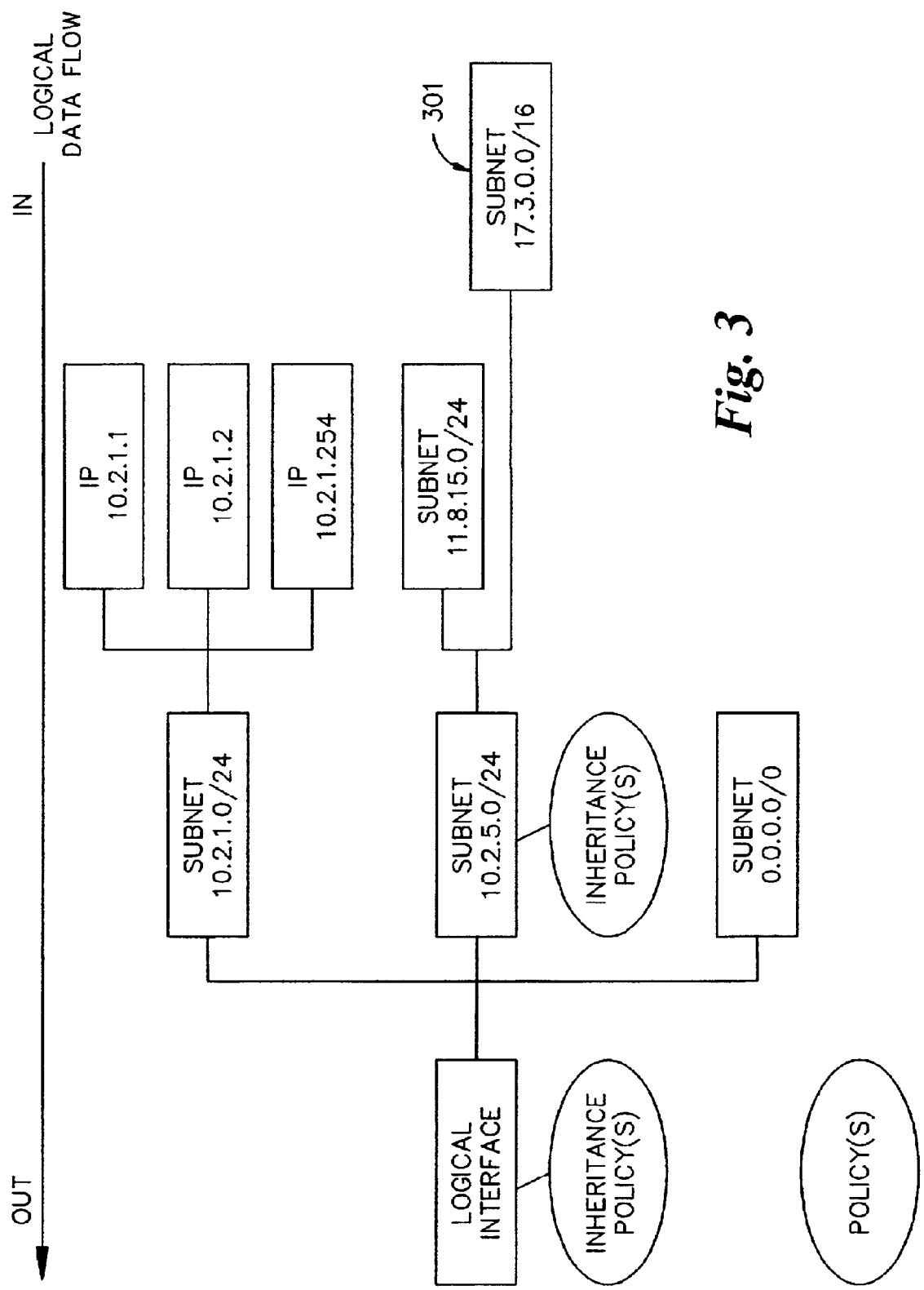
FIG. 3 is a block diagram of typical hierarchical topology created by a bandwidth control system according to the present invention.

Continuing with FIGS. 4 and 6, the packet discussed in the previous paragraph is taken from the received packet queue 703 and a source/destination address mapping table 405 is consulted. Table 405 contains two lists: (1) a list of each interface and subnet address range sorted by increasing address range size (number of addresses) and (2) a separate list of exact IP addresses which are preferably indexed via hashing with separate chaining, sub-sorted by application type (if used). Each list is constructed from the topology information as shown in FIGS. 2 and 3 as pointers to individual topology representation objects, which are discussed below. Furthermore, each list indicates the direction, inbound or outbound, which the object represents. As such, for topology representations which are symmetrical, two topology objects will be registered in table 405 for each point, one for inbound and a second for outbound. The object that is selected from the table depends on the direction of packet flow. The search of table 405 will yield pointers to two topology representation objects. The source IP address yields an outbound IP object from 402 (shown in FIG. 2 as IP 213). The destination IP address yields an inbound subnet object from 407 (shown in FIG. 3 as subnet 301).

Continuing with FIGS. 4 and 6, a wrapper 406 is created for the packet that contains pointers to the source and destination representation objects and preferably, for performance reasons, a pointer to the packet rather than the actual packet contents. The source and destination object types and priorities are compared to determine whether the packet wrapper 406 should be queued on the source or destination object through a decision process described below in detail. In this case, given equal source and destination object priorities, the source object 213 is a more specific type (IP address) than the destination object (subnet). Consequently, the source object 213 is chosen as the object on which wrapper 406 is to be queued. A pointer to object 213 is placed into a priority insert list 408. The priority insert list 408 contains a list of pointers, sorted by priority, of each object which currently has one or more packets queued. At a periodic update interval, preferably nominally 10 milliseconds, this list is examined and utilized to control the order in which the packet wrappers (like that of 406) are granted approval to transmit. The approach is to calculate/update the objects within the topology representations to ensure that packet transmission through the destination object interface will not exceed the transfer limits associated with any of the pertinent objects in the topology representations. Once it has been determined that the transmission of the packet will not violate any of the restrictions imposed by the topology representation, the packet specified in the packet wrapper 406 is forwarded to the priority insert list 408 for transmission to the destination host.

Referring to FIGS. 6 and 7, the packet is forwarded to the packet driver 603 destined for interface #3 605, where it is placed into a send packet queue 704 for transmission at the operating system's earliest convenience. The send procedure 705 will relay the packet through the operating system's protocol interface layer 602, physical driver 604 to physical interface 605, where it is transmitted. Once transmitted, the packet buffer is marked as free and returned to the free packet queue 702 for reuse. Note that if the interfaces are operating in a promiscuous mode, the packet upon transmission will also be received by the same interface #3. This is anticipated and handled by the receive procedure 700 and MAC table 701, which will find that the source MAC address of the packet echoed on interface #3 exists on interface #1 and will therefore ignore it.

Figure 5A:
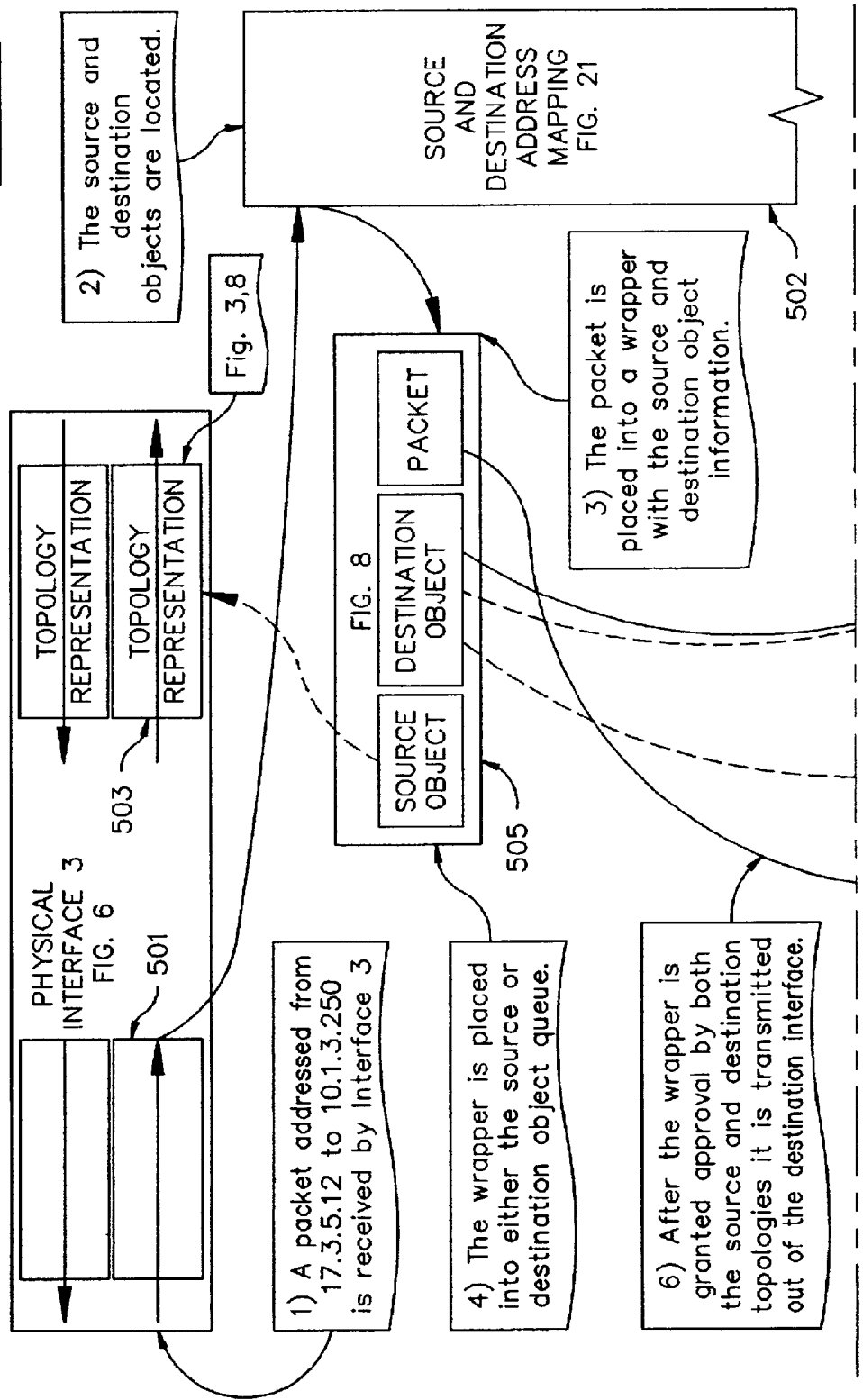
FIG. 5 is a block diagram showing a flow of packets through a bandwidth control system according to the present invention.

Referring to FIGS. 5 and 6, packets returned from the IP host at 17.3.5.12 and directed to 10.1.3.250 are received by interface #3 and checked against the source/destination address table 502, which determines (1) the source IP address to map to outbound object 301 from 503 and (2) the destination address to map to inbound object 213 from 504. Again, a packet wrapper 505 is created which contains the source and destination object pointers and preferably a pointer to the packet contents. As described in detail below, the source and destination object priorities are evaluated to determine whether the packet wrapper 505 should be queued on the source or destination object. In this case, given equal source and destination object priorities, the destination object 213 is a more specific type (IP address) than the source object 301 (subnet). Consequently, the wrapper 505 will be placed into the queue of object 213, and a pointer to object 213 will be placed into priority list 506. At a periodic update interval this list is examined and utilized to control the order in which the packet wrappers (like that of 505) are granted approval to transmit. The approach is to calculate/update the objects within the topology representations to ensure that packet transmission through the destination object interface will not exceed the transfer limits associated with any of the pertinent objects in the topology representations. Once it has been determined that the transmission of the packet will not violate any of the restrictions imposed by the topology representation, the packet specified in the wrapper 505 is forwarded to the priority insert list 506 for transmission to the destination host.

Referring to FIGS. 6 and 7, the packet is forwarded to the packet driver 603 destined for interface #1 600, where it is placed into a send packet queue 704 for transmission at the operating system's earliest convenience. The send procedure 705 will relay the packet through the operating system's protocol interface layer 602, physical driver 601 to physical interface 600, where it is transmitted. Once transmitted, the packet buffer is marked as free and returned to the free packet queue 702 for reuse. Note that if the interfaces are operating in a promiscuous mode the packet upon transmission will also be received by the same interface #1. This is anticipated and handled by the receive procedure 700 and MAC table 701, which will find that the source MAC address of the packet echoed on interface #1 exists on interface #3 and will therefore ignore it.

Figures 8, 8A:
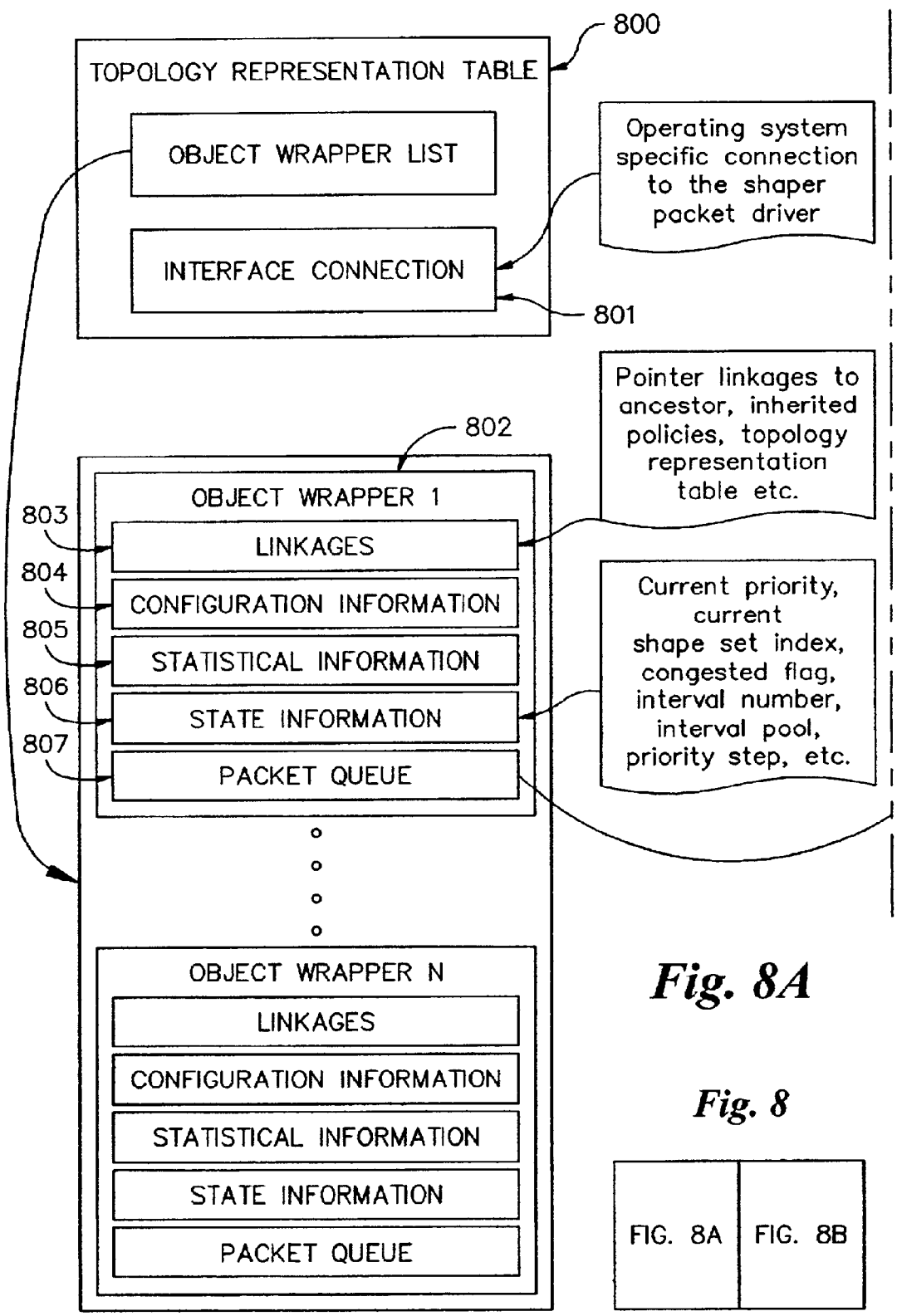
FIG. 8 is a block diagram of the contents of a topology representation for a bandwidth control system according to the present invention.
Figure 8B:
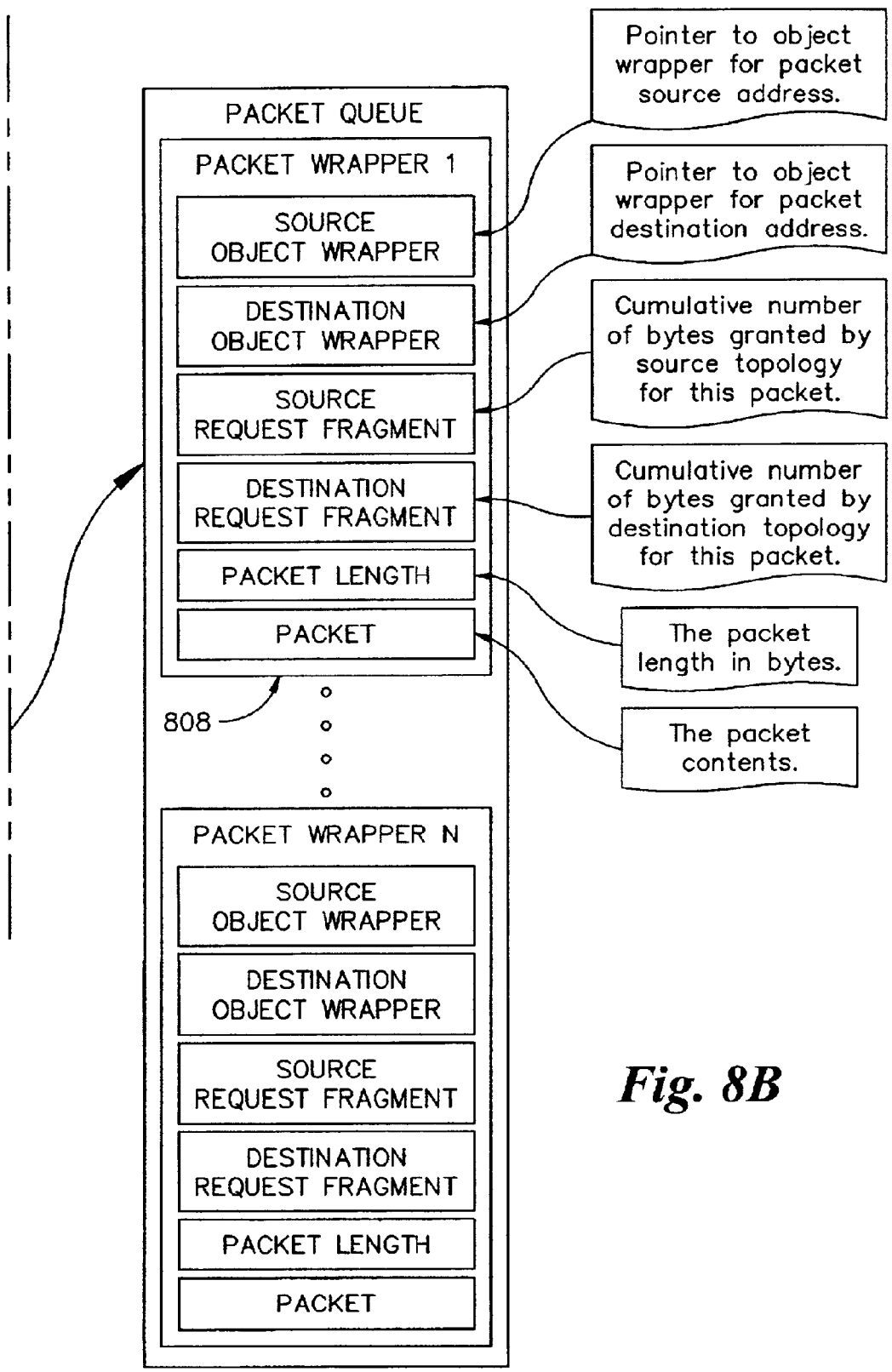

Referring to FIG. 8, a topology representation for each direction of traffic flow 800 for an interface consists of a collection of objects which are linked together in a hierarchical manner to produce a representation of logical and/or physical network topology. The topology contains an interface connection 801 that may be either an abstract connection identifier or preferably a section of memory shared between the traffic shaper 107 and the packet driver 108 through which packet data may be passed. The topology representation maintains a table of one or more objects, like 802, which represent particular point(s) within a logical or physical network. For clarity, a set of object types that matches the TCP/IP protocol has been chosen, but it should be readily apparent that object types representing virtually any type of topology may be easily constructed without departing from the spirit and scope of the present invention.

Each object 802 consists of a set of linkage information 803, configuration information 804, statistical information 805, state information 806, and packet wrapper queue 807.

Figure 9B:
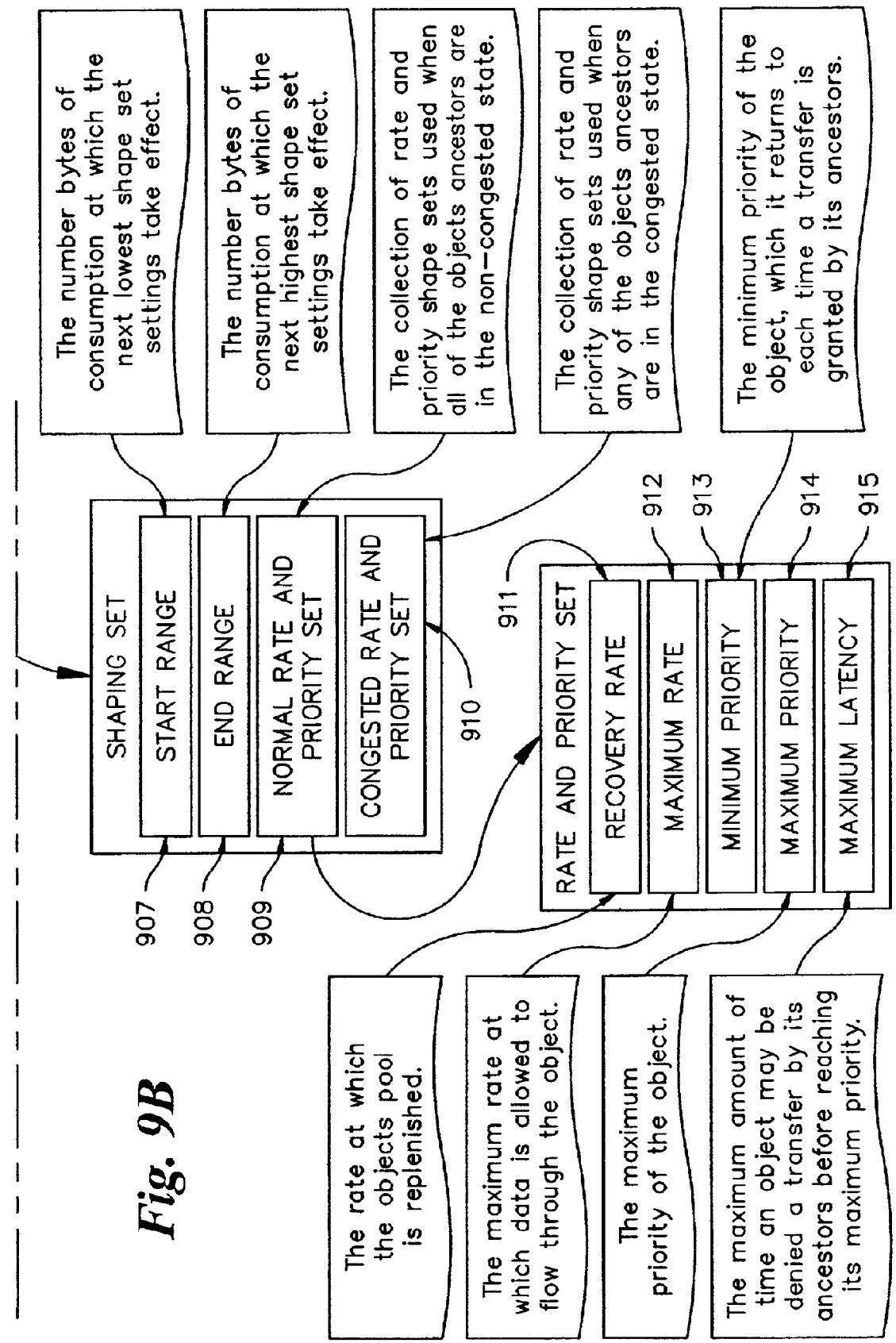
FIG. 9 is a block diagram of the configuration information that describes a topology object in a bandwidth control system according to the present invention.

Referring to FIG. 9, the configuration information for each object 802 consists of general information 900, linkage object identifiers or OIDs 901, network address information 902, and shaping information 903.

The general information 900 contains the type of object (e.g., Logical Interface, Subnet, Group, IP, IP/Application, etc.), a unique object identifier (OID) which specifies a specific object throughout all of topology representations within the traffic shaper 107, the OID of the policy from which the objects configuration information was derived or inherited, a flag indicating if the object should inherit its configuration settings from the nearest ancestor with a policy which matches this object type, a flag which indicates if statistics for this object are of long term interest, a conflict flag which indicates if some facet, typically the IP address, conflicts with another object, the access rights granted to the object and an alphanumeric name for display purposes.

The linkage OIDs 901 contains the OIDs of other related objects. Examples of these are the object's ancestor or parent, the first or next object in a list of policies related to the object, a source route OID which specifies a specific object in a topology representation of another interface to which all traffic should be forwarded regardless of CIDR routing rules.

The address information 902 contains the network address or network number (ISO layer 3—e.g., IP) which the object represents, the sub-network mask or type (e.g., CIDR variable subnet or A/B/C fixed classes), the application protocol type (ISO layer 4—e.g., HTTP, FTP, etc.), the physical address (ISO layer 1 MAC), the address discovery mode (e.g., by ISO 3, by ISO 2, by DHCP lease, etc., or none), a use DHCP flag which indicates that the system should track DHCP leases for this object, and a name resolution method (e.g., DNS name from IP, LDAP name from MAC, LDAP name from IP, DNS IP from name, LDAP IP from name, LDAP MAC from name, etc., or none).

Returning to FIG. 8, the object state information 806 contains (1) the current priority value of the object, (2) an index specifying the current shape set index, (3) a flag indicating if the object is congested (i.e., has been requested to pass more traffic than is permitted), (4) a sequential periodic interval number which indicates the last periodic interval on which the object state information was updated, (5) an interval pool which indicates the maximum number of bytes which are permitted to pass through the point the object represents with a periodic update interval, (6) a priority step amount which indicates by how many priority levels an object priority should increase for each periodic interval in which transmission of a packet has been denied by any of the object ancestors, and (7) a consumed pool which maintains a running count of the number of bytes permitted to pass though the point the object represents.

Continuing with FIG. 9, the shaping information 903 contains a maximum queue depth value 904 which specifies a maximum number of packet wrappers which may be queued on the object concurrently and a number specifying a quantity of shaping sets 905. Each shaping set 906 has a starting range 907, an ending range 908 expressed in bytes that are compared against the consumed pool of 806. If the consumed pool reaches the value of 908, then the shape set index of 806 is incremented but limited to the value of shaping set 905. At a periodic update interval the consumed pool is reduced by a recovery rate contained with the shaping information, and upon falling below the start range 907 of the current shape set as indexed by the shape set index of 806, the shape set index decrements if non-zero. The shape set index of 806 is used as an index into the array of rate and priority sets 906. Each shaping set 906 also has a normal rate and priority set 909 and a congested rate set 910 which control the behavior of the object in normal versus congested conditions. If none of the object's ancestors are currently in a congested state, the normal rate set 909 is utilized; otherwise the congested rate set 910 is utilized.

Each rate and priority set 909 or 910 contains a recovery rate 911 that controls the rate at which the consumed pool in 806 is reduced over time. This amount is subtracted from the consumed pool at the periodic update interval to provide a moving window effect for shaping set changes. The rate and priority sets may be configured to provide for a decreasing rate as the consumption pool increases, by setting the maximum rate value 912 for sequential higher rate and priority sets to progressively lower amounts. Each rate and priority set also has a minimum priority 913, maximum priority 914, and maximum latency value 915. The minimum priority 913 and maximum priority 914 control the range of priorities at which the object may be placed into the priority list 408. The maximum latency value 915 is expressed in milliseconds and is used to derive a priority step value for 806 by dividing the product of the number of millisecond per periodic update interval and the difference between the maximum and minimum priority levels by the maximum latency 915:

Priority Step=(ms per interval*(Max Priority−Min Priority))/Max Latency in ms)

It should be apparent that by using multiple shaping sets 906, a nearly infinite number of combinations of rate, priority, and latency may be created which react automatically to changing consumption, congestion, and load patterns, as reflected in the object, its ancestors, and descendents.

Figures 10, 10A:
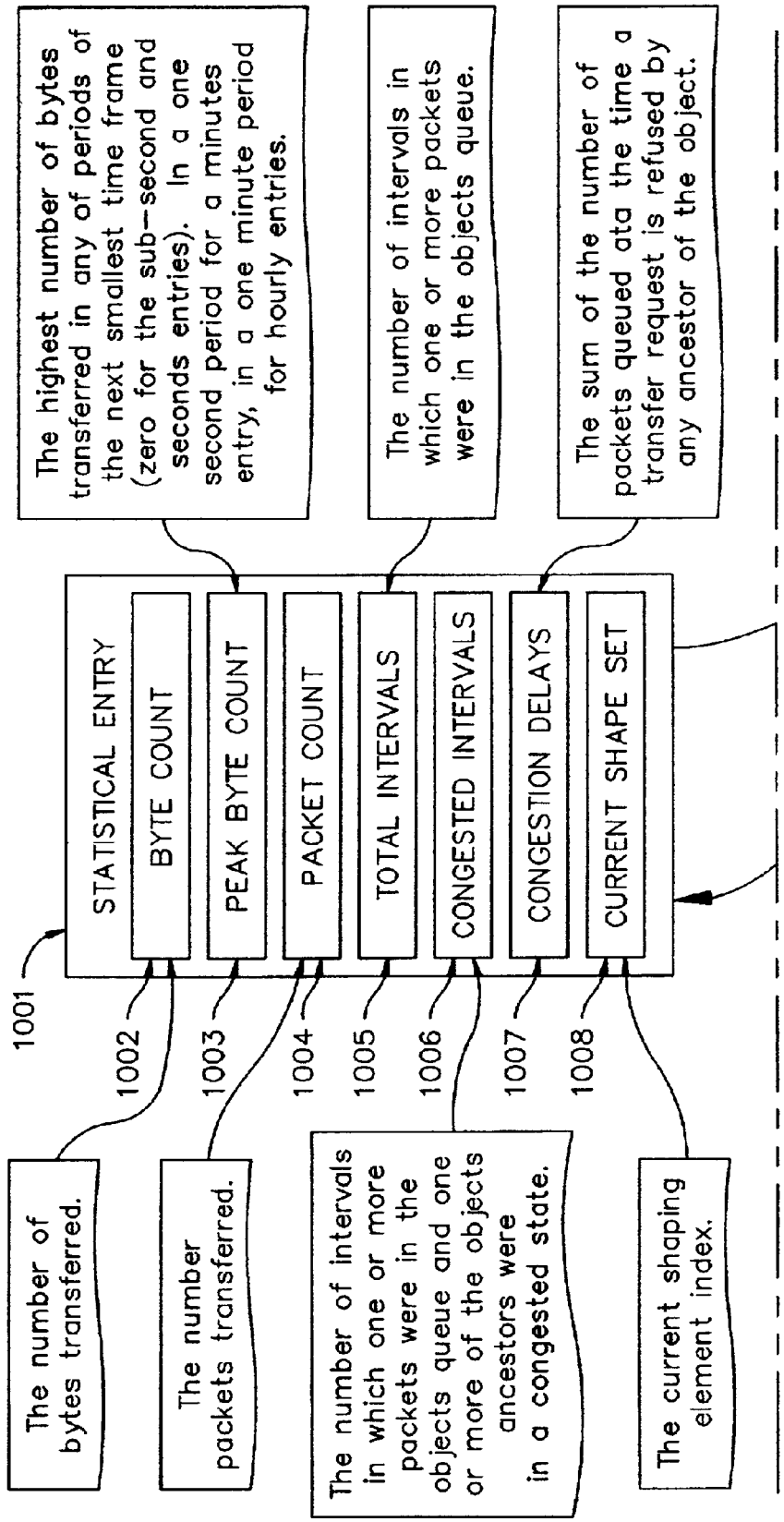
FIG. 10 is a block diagram of the statistical information contained within a topology object in a bandwidth control system according to the present invention.
Figure 10B:
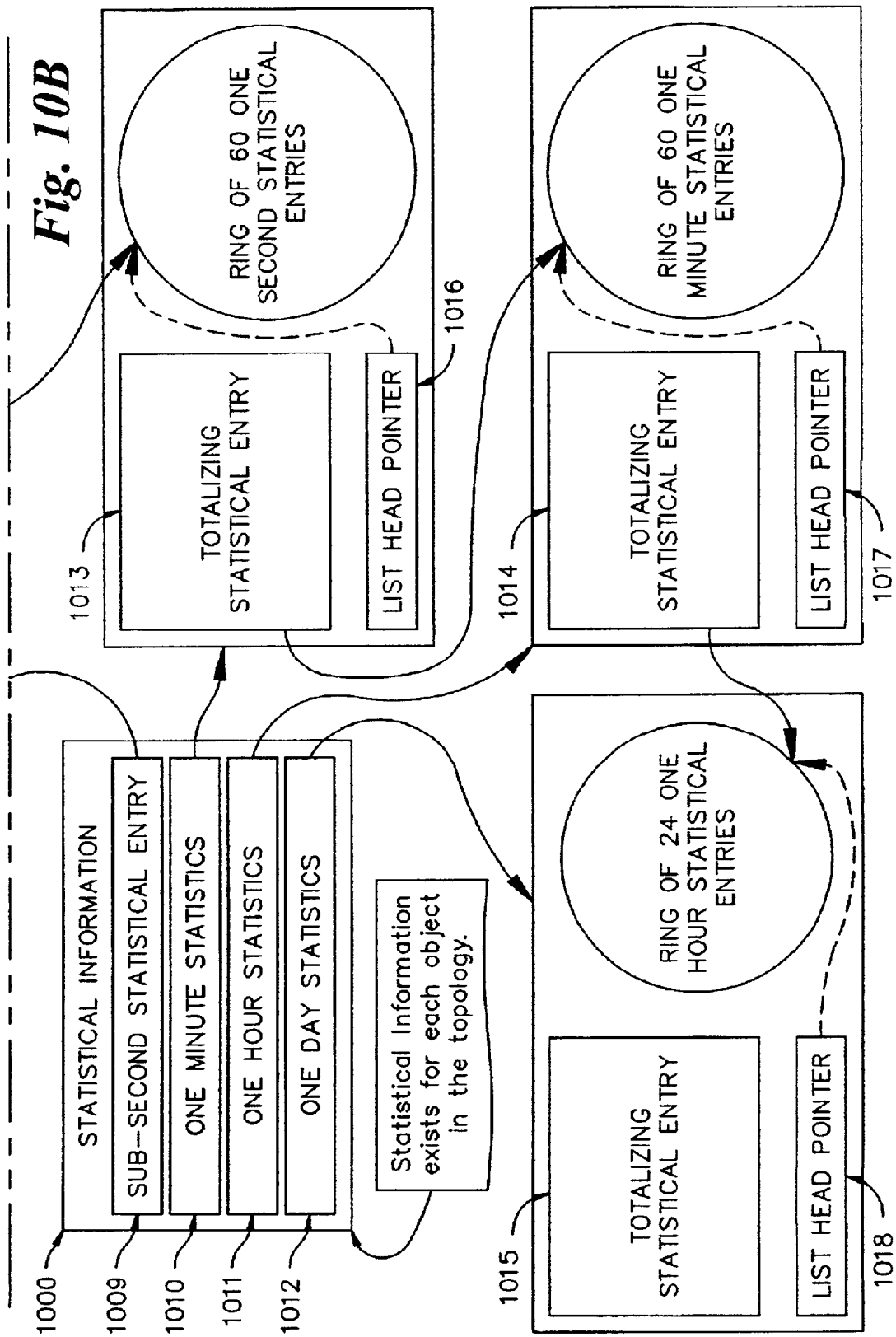

Referring to FIG. 10, each topology object maintains a collection of statistical information 1000 which records pertinent values which indicate not only the traffic flow through the point the object represents, but metrics reflecting the extent to which the point was affected by congestion occurring in its ancestors. Each statistical entry, such as 1001, contains summary statistics for a specific period, typically 1 second, 1 minute, or 1 hour. Each contains (1) a byte count 1002 that indicates the number of bytes that have been permitted to pass through the object within a period of time, (2) a peak byte count 1003 that indicates the highest number of bytes permitted to pass through the object within the next finest granularity of time (e.g., for an hour entry, the peak byte count 1003 indicates the greatest value in the previous 60 minutes; for a minute entry, the peak field indicates the greatest value in the previous 60 seconds), (3) a packet count value 1004 which indicates the number of packets which have passed through the object, (4) a total periods count 1005 which indicates the number of periodic update intervals in which the object had one or more packets queued, (5) a congested intervals count 1006 which indicates the number of periodic update intervals in which the object has one or more packets queued and any of its ancestors are congested (6) a congestion delays value 1007 that indicates the sum of the number of packets delayed by each refusal of an ancestor to grant permission to transmit, and (7) the current shape set 1008 that indicates the value of the current shape set index from the state information 806 at the conclusion of the time period.

Statistical entries such as 1001 are gathered into a series of cascading ring buffers, each of which represents a time span relative to the current time. Entry 1009 is a single entry representing the values for the previous second. Ring 1010 is sixty entries representing the previous sixty seconds. Ring 1011 is sixty entries representing the previous sixty minutes. Ring 1012 is twenty-four entries representing the previous twenty-four hours. Each ring 1010, 1011, and 1012 contains a totalizing entry 1013, 1014, 1015 and list head pointer 1016, 1017, 1018, respectively. The fields within the totalizing entry contain the sum of the corresponding fields with the individual entries in the ring. Each list head pointer points to the oldest entry in the ring.

Continuing with FIG. 10, as the host clock changes to the next second, the ring entry pointed to by 1016 is subtracted from the totalizing entry 1013, the sub-second totalizing entry 1009 overwrites the entry pointed to by the list head pointer 1016 and is added to the totalizing entry 1013, the totalizing entry 1009 is cleared to zeros, and the list head pointer 1016 is incremented modulo 60. Therefore, totalizing entry 1013 always reflects the sum of the entries contained with the ring. In a similar manner, as the host clock changes to the next minute, 1011 is updated by subtracting the ring entry indexed by 1017 from totalizing entry 1014, totalizing entry 1013 overwrites the ring entry indexed by 1017 and is added to totalizing entry 1014, and list head pointer 1017 is incremented modulo 60. Also, in a similar manner, as the host clock changes to the next hour, 1012 is updated by subtracting the ring entry indexed by 1018 from totalizing entry 1015, totalizing entry 1014 overwrites the ring entry indexed by 1018 and is added to totalizing entry 1015, and list head pointer 1018 is incremented modulo 24.

Figure 11:
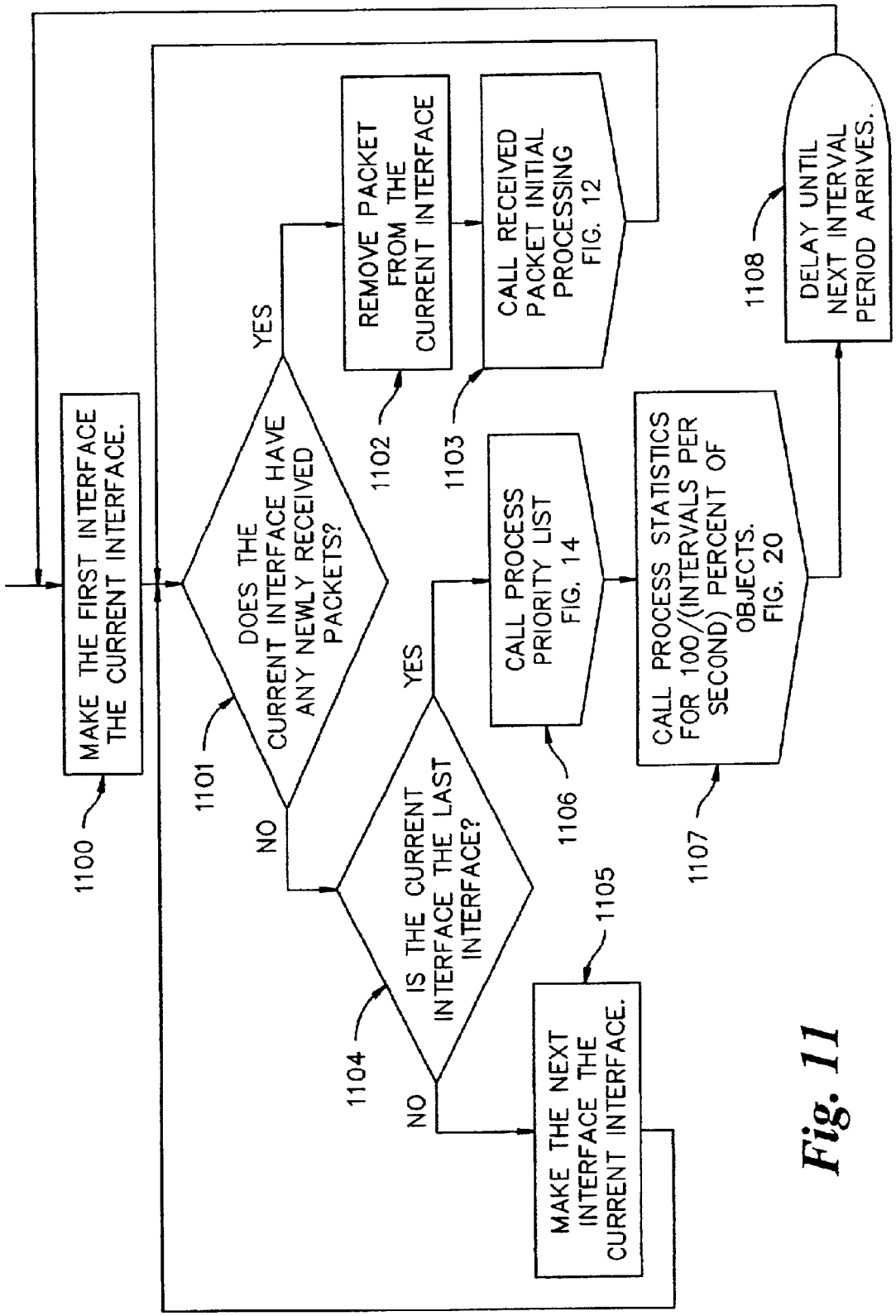
FIG. 11 is a flowchart of the main processing loop for a bandwidth control system according to the present invention.

Referring to FIG. 11, the main processing loop is performed for each periodic update interval, preferably nominally every 10 milliseconds, providing the core process for traffic shaping. A current interface index 1100 is set to point to the first interface system 400. Next, at 1101, the physical interface 401 is checked via the connection handle 801 within object 402 for new packets which have arrived at the interface and been queued on the shaper packet driver 603. If a new packet is found, it is removed at 1102 from the received packet queue 703 and undergoes the received packet initial processing at 1103, as shown in detail in FIG. 12. The processing then continues at 1101 until no more packets are found at 1104. If the current interface index is not pointing to the last interface system, the current interface index increments at 1105, and the process continues at 1101. At this point all the packets that have been received by the physical interfaces have been accepted and placed into queues on specific topology representation objects. Next, at 1106, the process priority list process (shown in detail in FIG. 14) is performed, which attempts to gain approval to transmit packets which have been queued on the topology objects, in order of decreasing object priority. Next, at 1107, the process statistics process (shown in detail in FIG. 20) is called, but only for a subset of all the topology objects in the system (the number of objects equaling the total number of topology objects in the system divided by the number of periodic update intervals in each second), such that all of the topology objects in the system are processed within one second of time. The entire process then goes idle until the next update interval is due.

Figure 12:
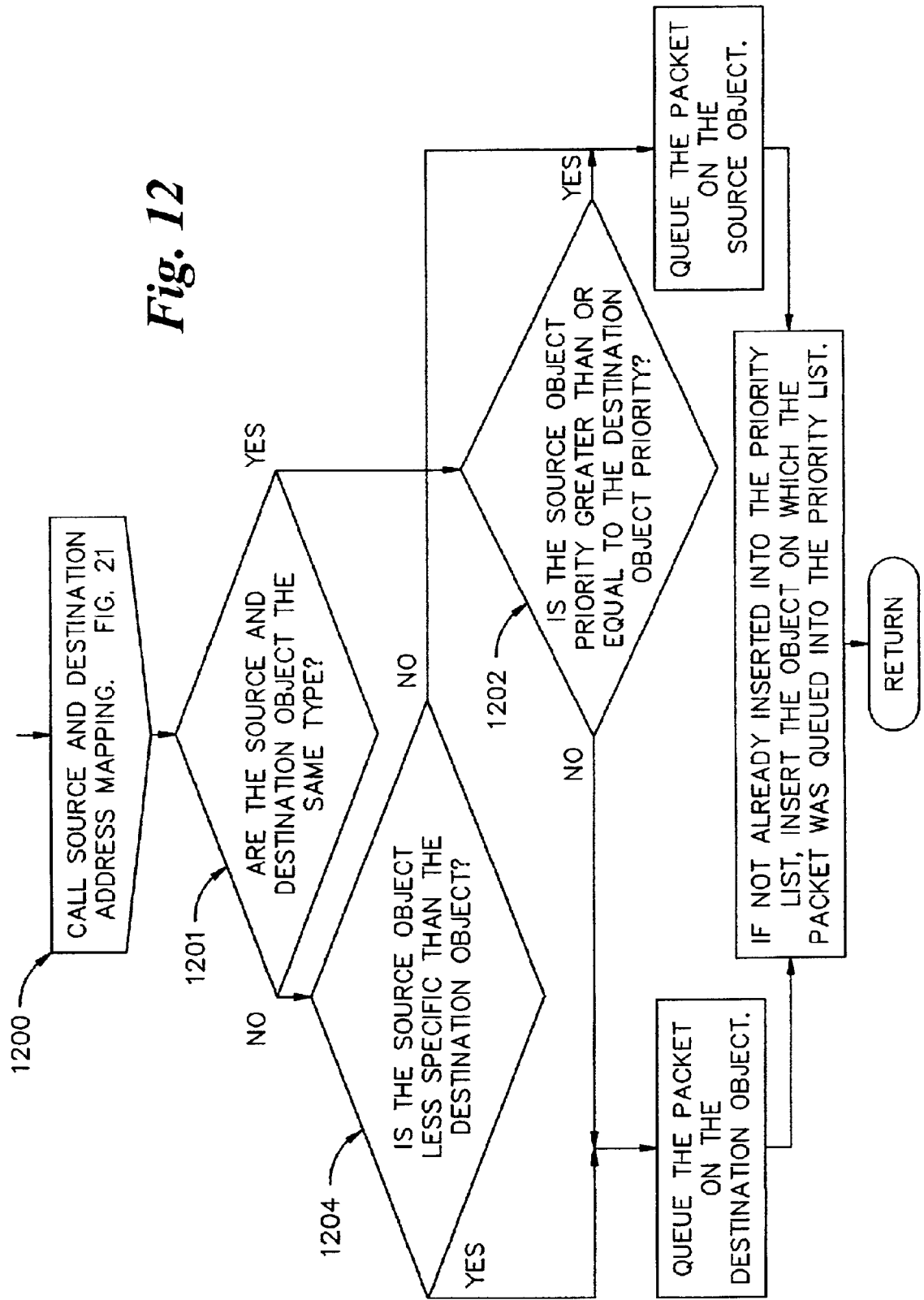
FIG. 12 is a flowchart of the initial processing of packets received from an interface in a bandwidth control system according to the present invention.

Referring to FIG. 12, each newly arriving packet is processed at 1200 by source and destination address mapping (shown in detail in FIG. 21), which identifies an appropriate source and destination topology object. A packet wrapper 808 is created which contains a pointer to the source object, a pointer to the destination object, and a pointer to or the contents of the packet. The packet length field is set to the total packet length, and all other fields are zeroed. The types of the source and destination objects are checked at 1201 to find if both are of the same type. If so, the current priority values contained in the state information 806 of the source and destination objects are compared at 1202. If the source object has a current priority value from the state information 806 greater than or equal to that of the destination object, the packet wrapper 808 is queued on the source object at 1203; otherwise it is queued onto the destination object at 1205. Returning to 1201, if the source object type from the general configuration information 900 is less specific than the destination object type, then the packet wrapper 808 is queued on the destination object at 1205; otherwise the object is queued on the source object at 1203. After the packet wrapper 808 has been queued on either the source or destination object, and the object is not currently in the priority list, a pointer to the object on which it was queued is inserted into the priority list at the current priority value of the state information 806.

Figures 13, 13A:
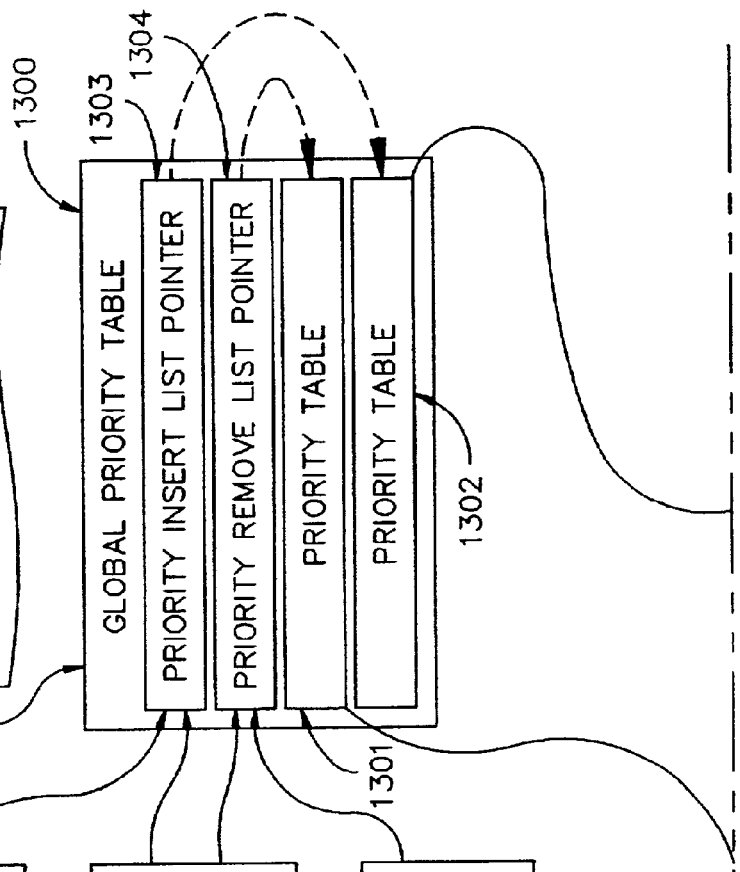
FIG. 13 is a block diagram of the insert and remove priority lists for a bandwidth control system according to the present invention.
Figure 13B:
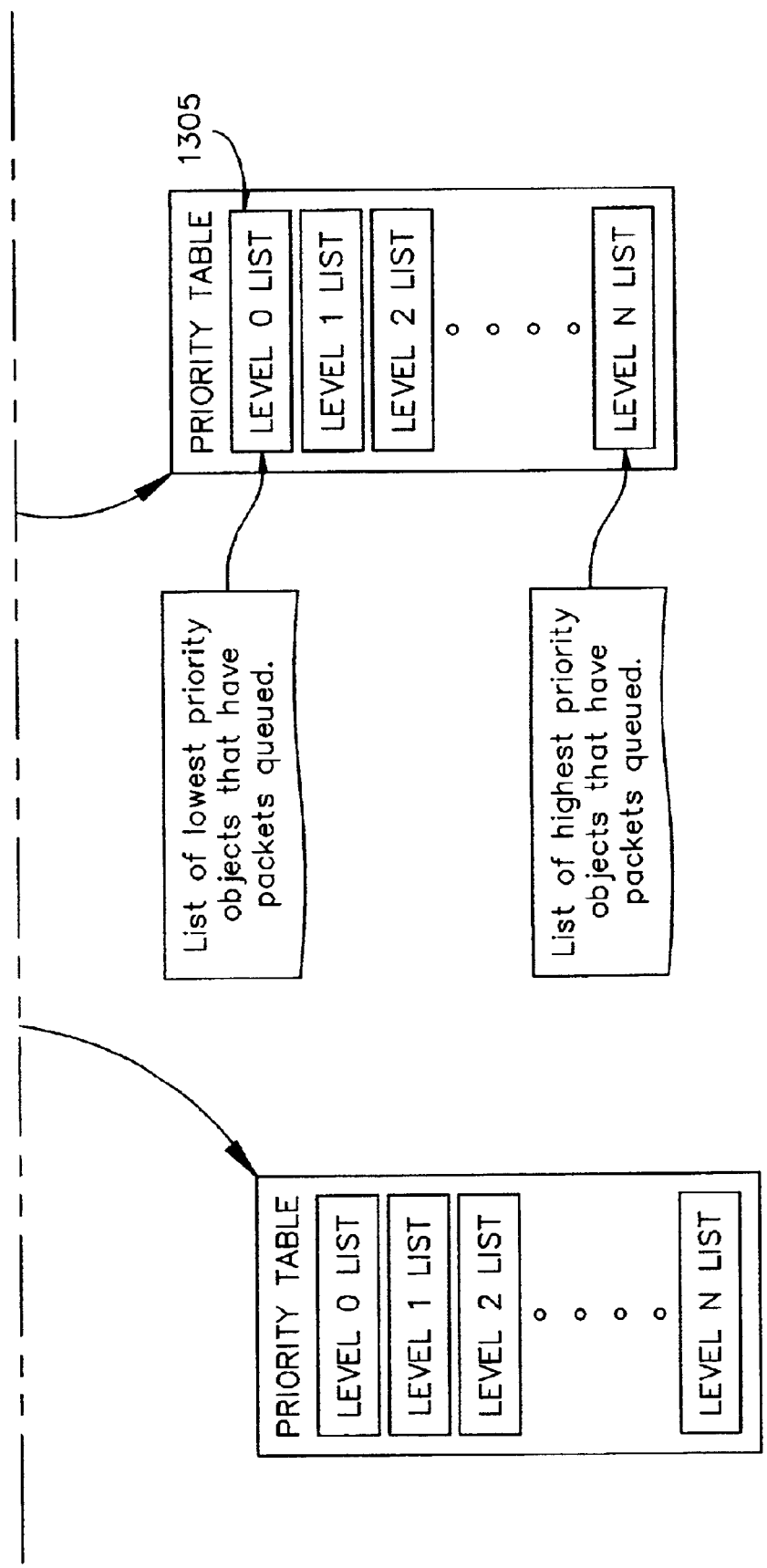

Referring to FIG. 13, the traffic shaper 107 maintains a global priority table 1300, containing two priority tables, 1301 and 1302, which identify all topology objects that have one or more packets queued. Two pointers 1303 and 1304 point to the priority tables 1301 and 1302 in a mutually exclusive manner. When a pointer to an object is to be inserted into the global priority table 1300, the table 1301, 1302 pointed to by 1303 is always used. The table 1301, 1302 is organized as a collection of priority level lists 1305, each of which represents a discrete priority level, although it will be understood by those of skill in the art that other mechanisms may be readily utilized without departing from the spirit and scope of the invention, provided the objects may be retrieved in descending order of priority. It is also preferred that individual objects within a priority level list 1305 be inserted and removed on a last-in/first-out basis to offer a degree of fairness among the objects sharing a priority level. During the main process loop (see FIG. 11), after all the packets received on the interfaces have undergone the received packet initial processing (see FIG. 12), the roles of the insert and remove priority tables 1301, 1302 within the global table 1300 are reversed by exchanging pointers 1303 and 1304.

Figure 14:
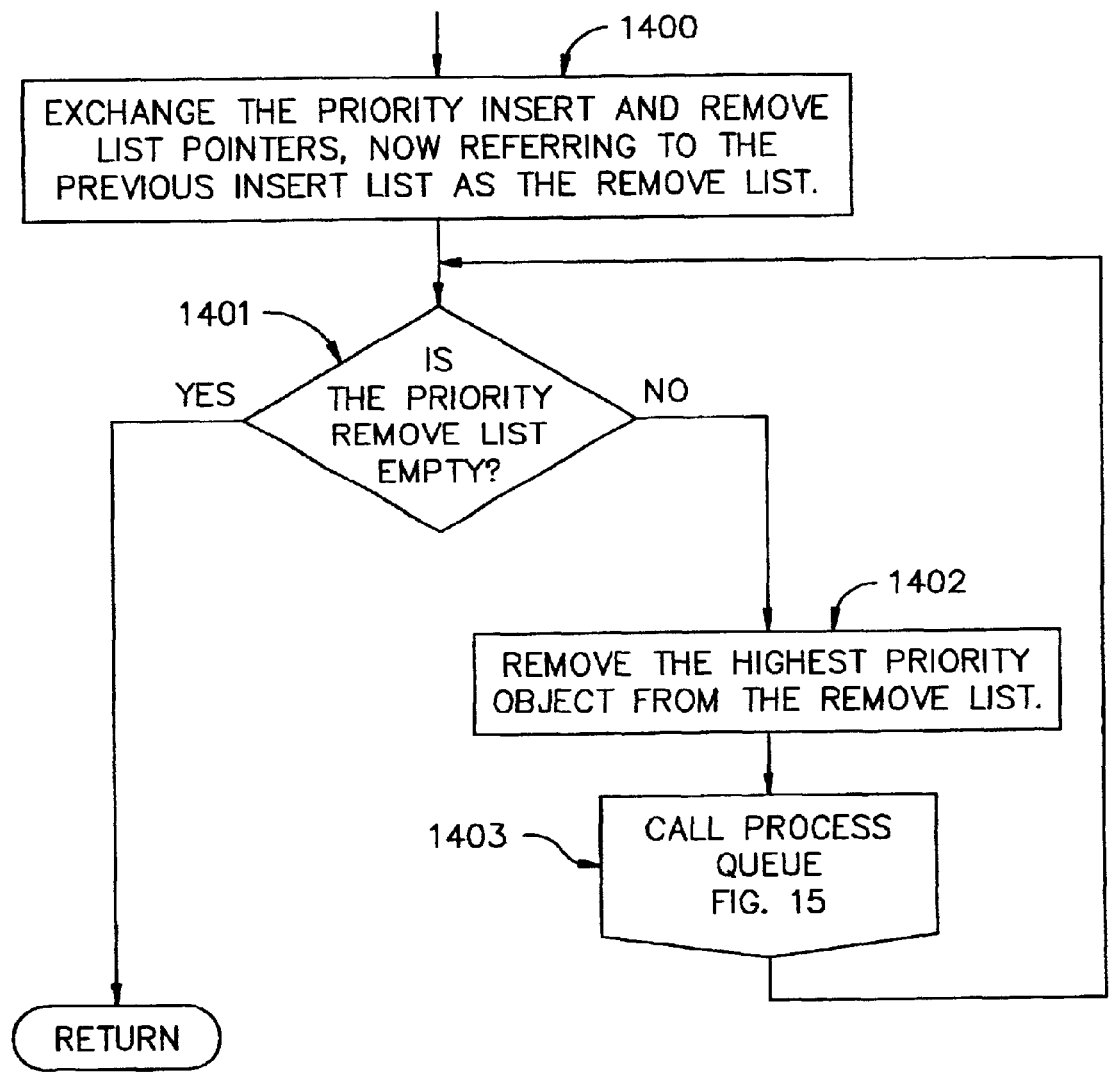
FIG. 14 is a flowchart of the process by which all object queues are taken from the remove priority list and acted upon in a bandwidth control system according to the present invention.
Figure 15:
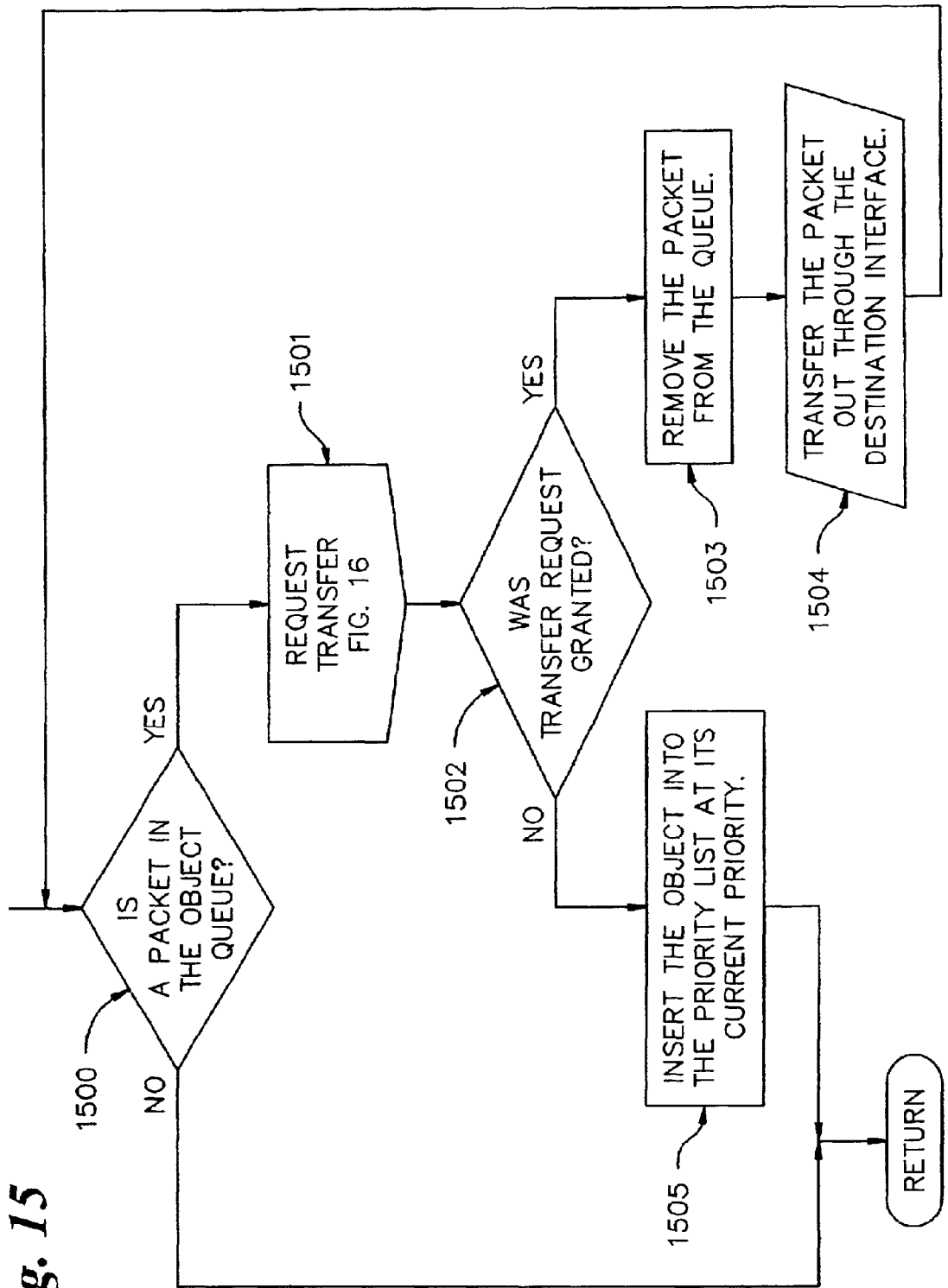
FIG. 15 is a flowchart of a single queue taken through the transfer request process in a bandwidth control system according to the present invention.

Referring to FIG. 14, during each periodic update interval all of the objects contained in the global priority table 1300 are processed first at 1400 by exchanging pointers 1303 and 1304. If the remove priority list pointed to by 1304 is empty at 1401, the process is completed. Otherwise, the highest priority object which exists in the table pointed to by 1304 is removed at 1402, and the process shown in FIG. 15 is performed on the object. The process resumes at 1401 until no further objects remain in the remove priority list.

Figure 16B:
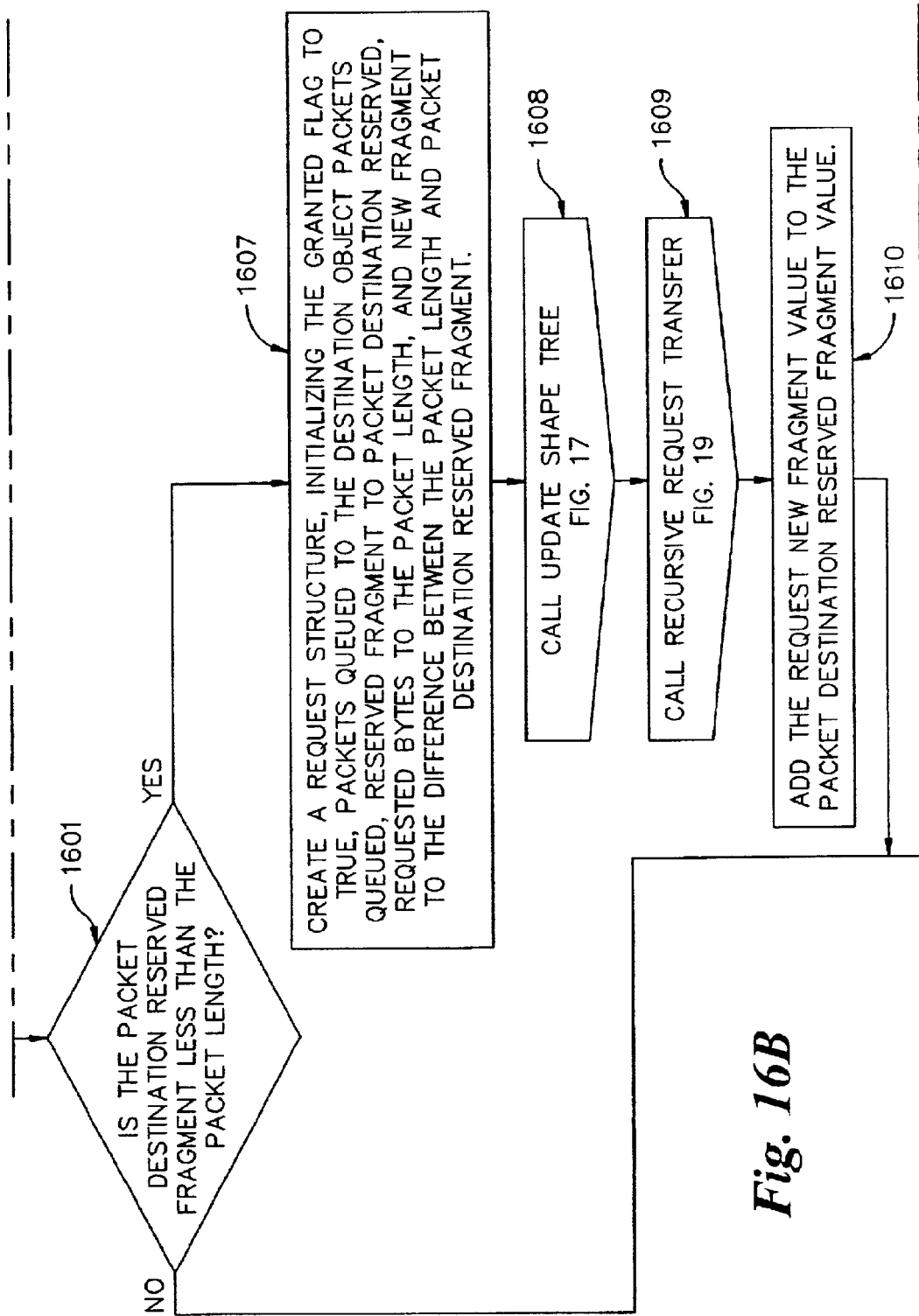
FIG. 16 is a flowchart of the transfer request process for an individual packet in a bandwidth control system according to the present invention.
Figure 16C:
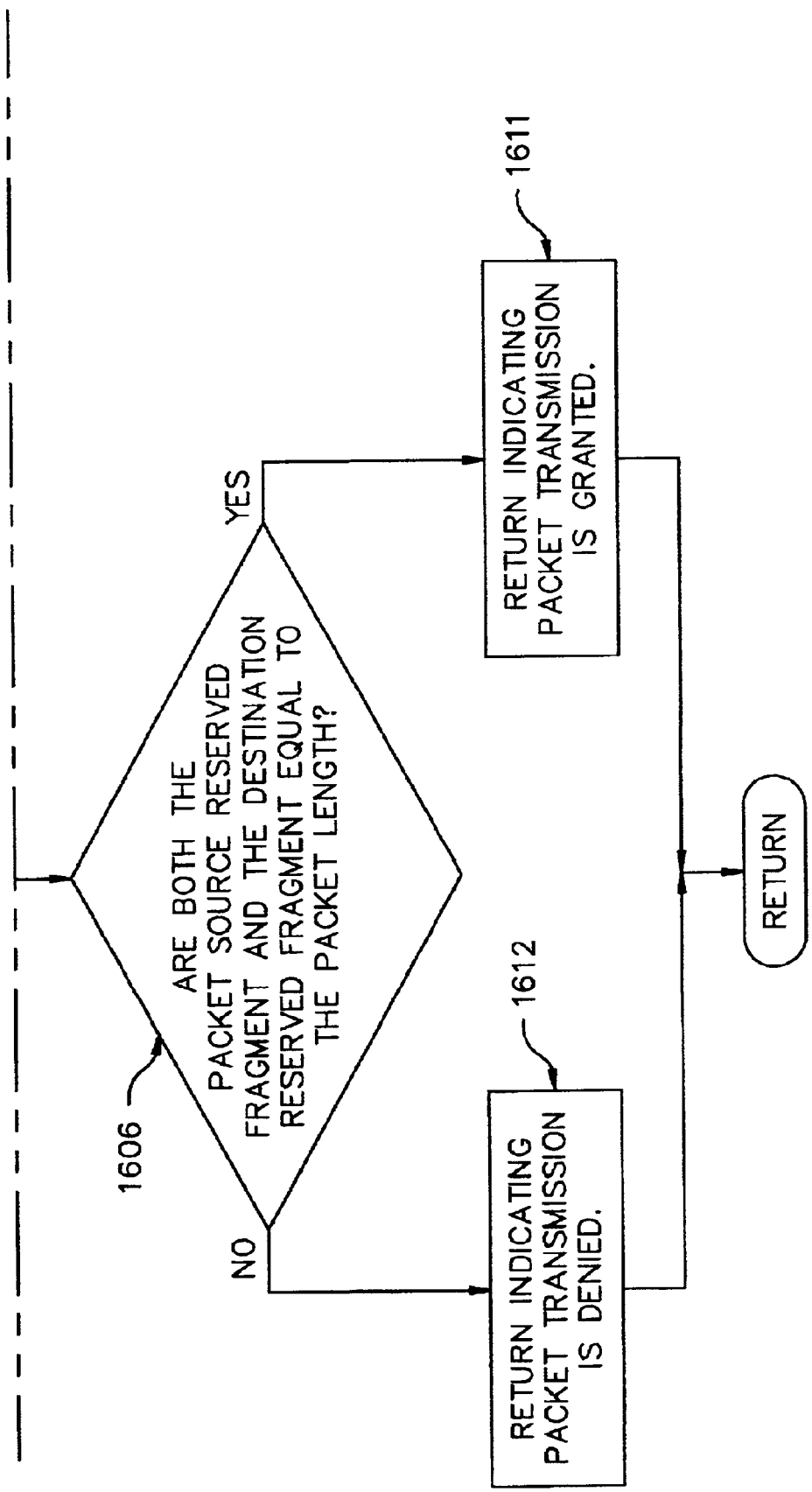

Referring to FIG. 15, if at 1500 the object has no packets in its queue, then the process is completed. Otherwise, the first packet wrapper 808 in the queue is examined at 1501 and undergoes the request transfer process as shown in FIG. 16. If the transfer request is granted, the packet wrapper 808 is removed from the queue, the packet contained or referenced is relayed via the connection handle 801 of the destination object topology representation to the packet driver for transmission at 1504, and processing resumes at 1500. If the transfer request was not granted at 1502, then a pointer to the object is inserted in the global priority table insert list as pointed to by 1303 at the current priority value indicated in the state information 806, and processing of the object concludes.

Referring to FIG. 16, the source reserved fragment and packet length as described in the packet wrapper 808 are compared, and if the source reserved fragment is not less than the packet length, then the topology representation which contains the source object has collectively granted permission for the traffic to pass, and processing resumes at 1601. Otherwise, at 1602, a request structure containing the following fields is created: (1) the source object, (2) a true/false granted flag with an initial state of true, (3) a packets queued count, initialized to the number of packets currently in the source object queue, and (4) a requested bytes field, initialized to the difference between the packet length and source request fragment value. Next, at 1603, the update shape tree process (as shown in detail in FIG. 17) is called for the source object specified in the wrapper 808. Next, at 1604, the recursive request transfer process (as shown in detail in FIG. 19) is called, passing the request structure. Next, at 1605, the request structure's requested bytes value is added to the packet wrapper's 808 source reserved fragment value, and processing continues at 1601.

Figure 17B:
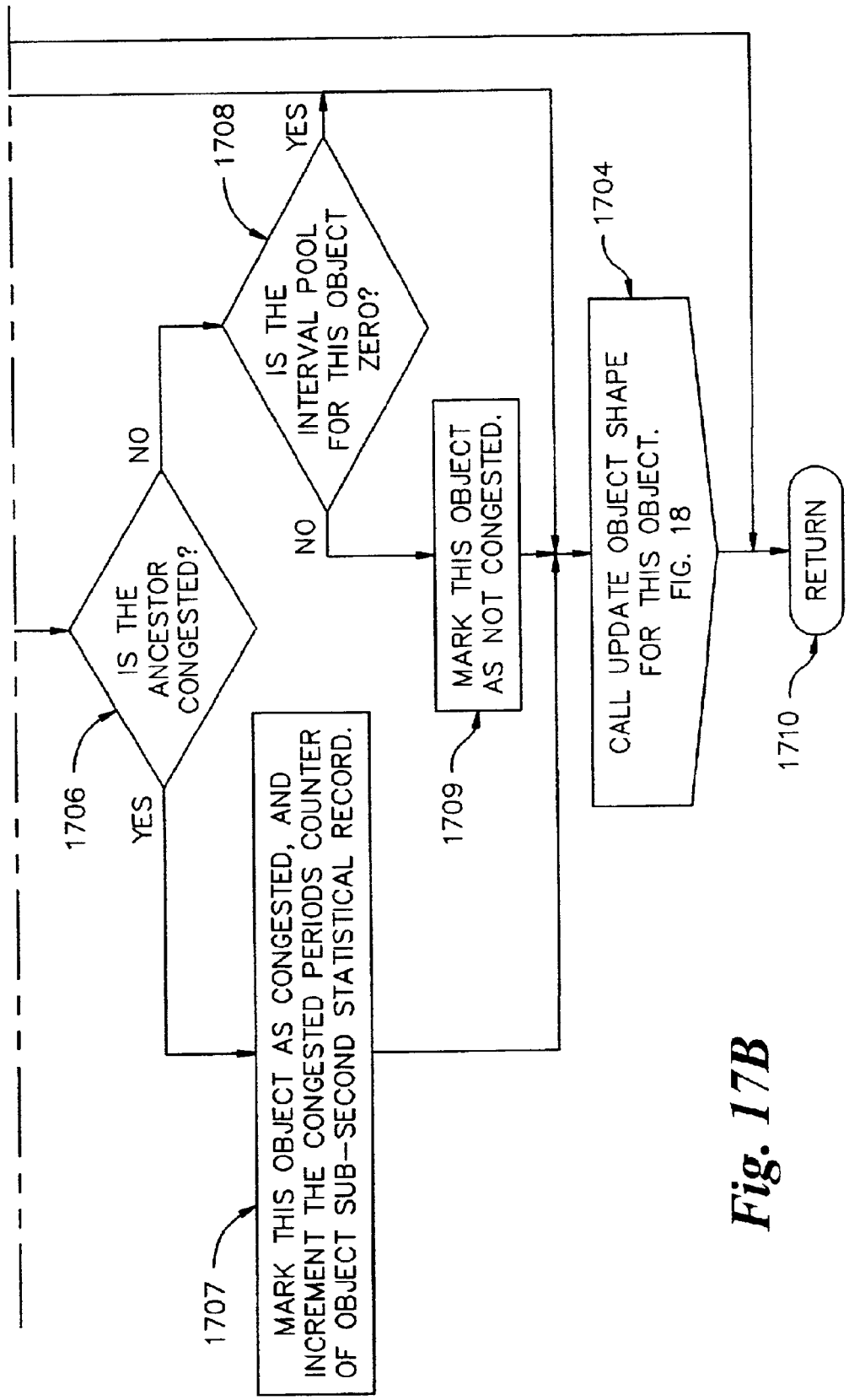
FIG. 17 is a flowchart of the shaping information update process for a branch of a topology representation in a bandwidth control system according to the present invention.
Figure 19A:
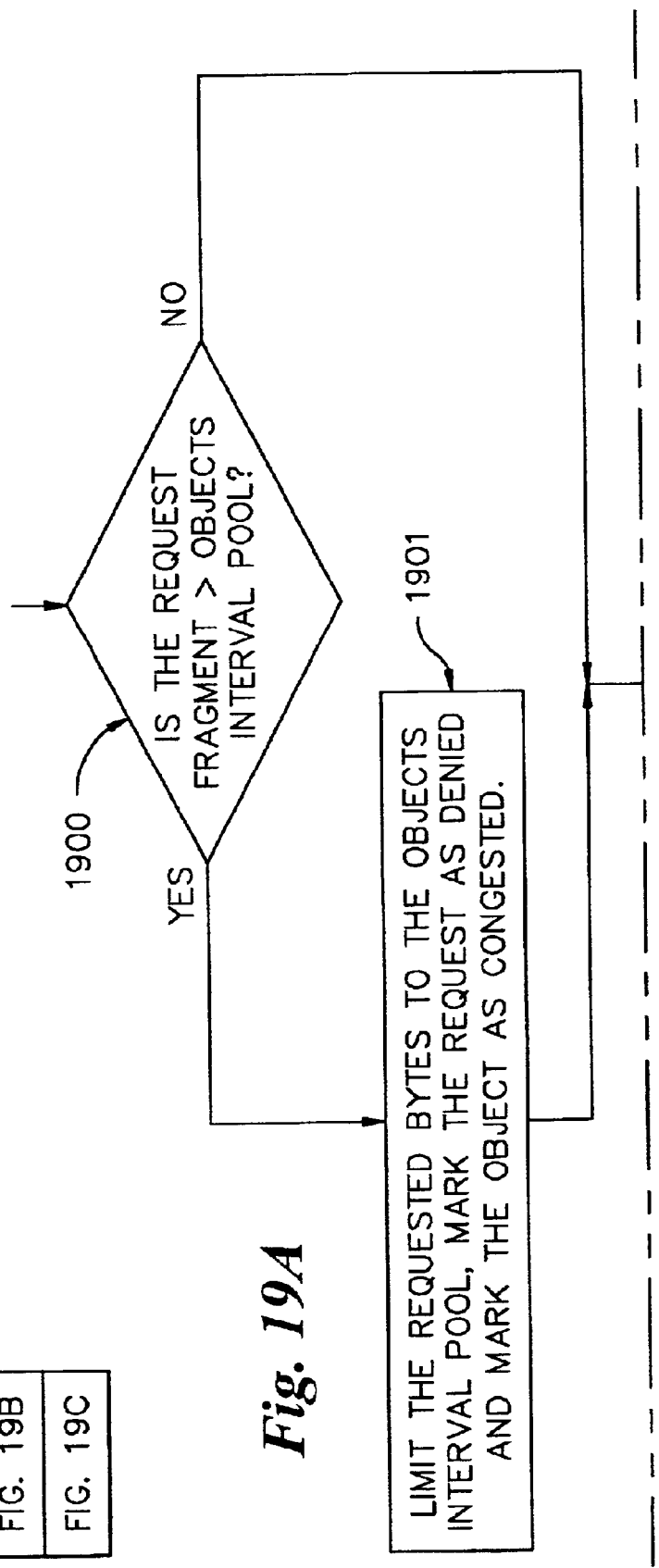
FIG. 19 is a flowchart of a topology representation being recursively traversed during a transfer request process in a bandwidth control system according to the present invention.
Figure 19:
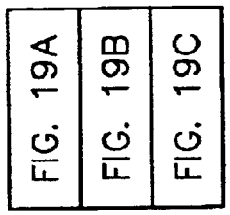
Figure 19B:
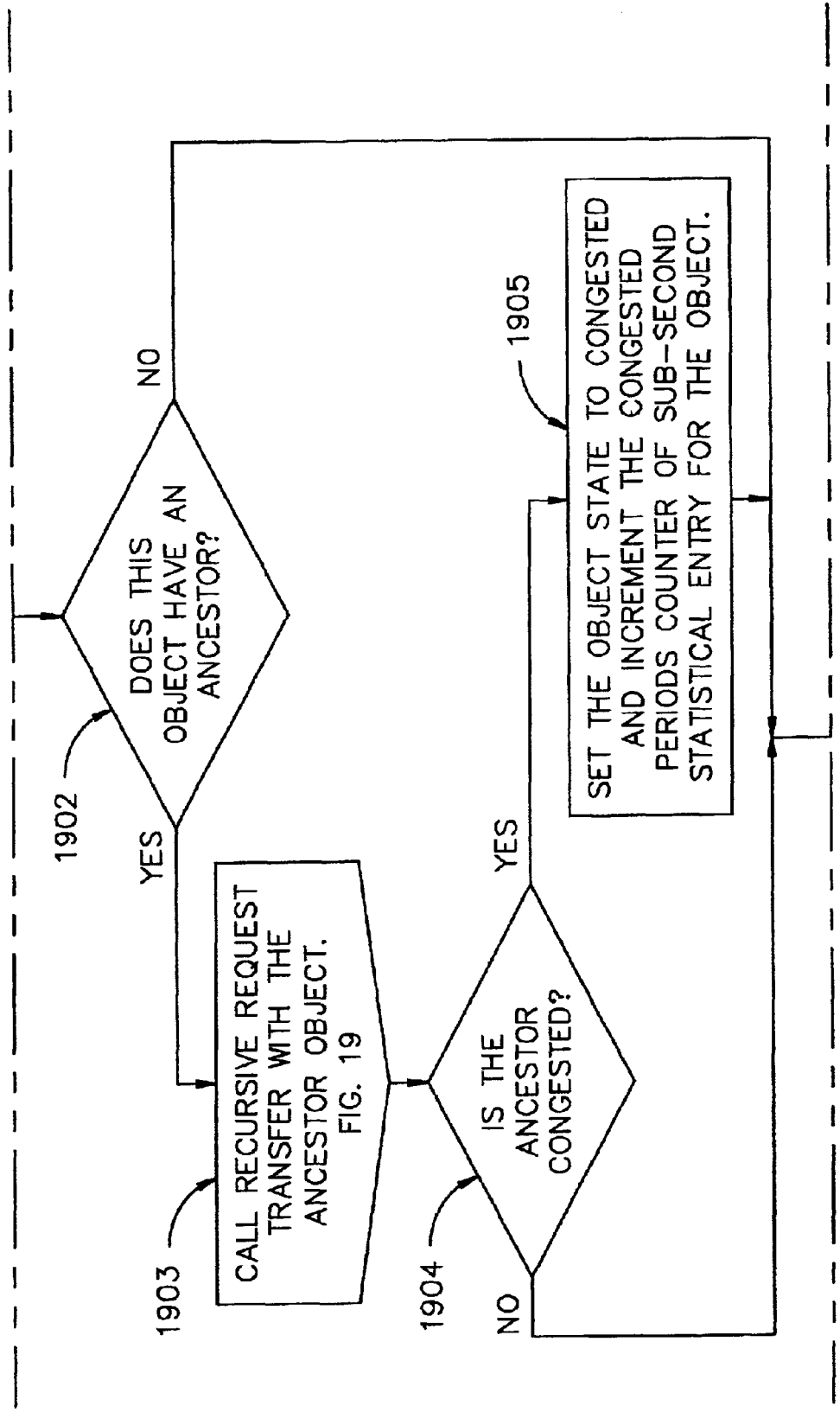
Figure 19C:
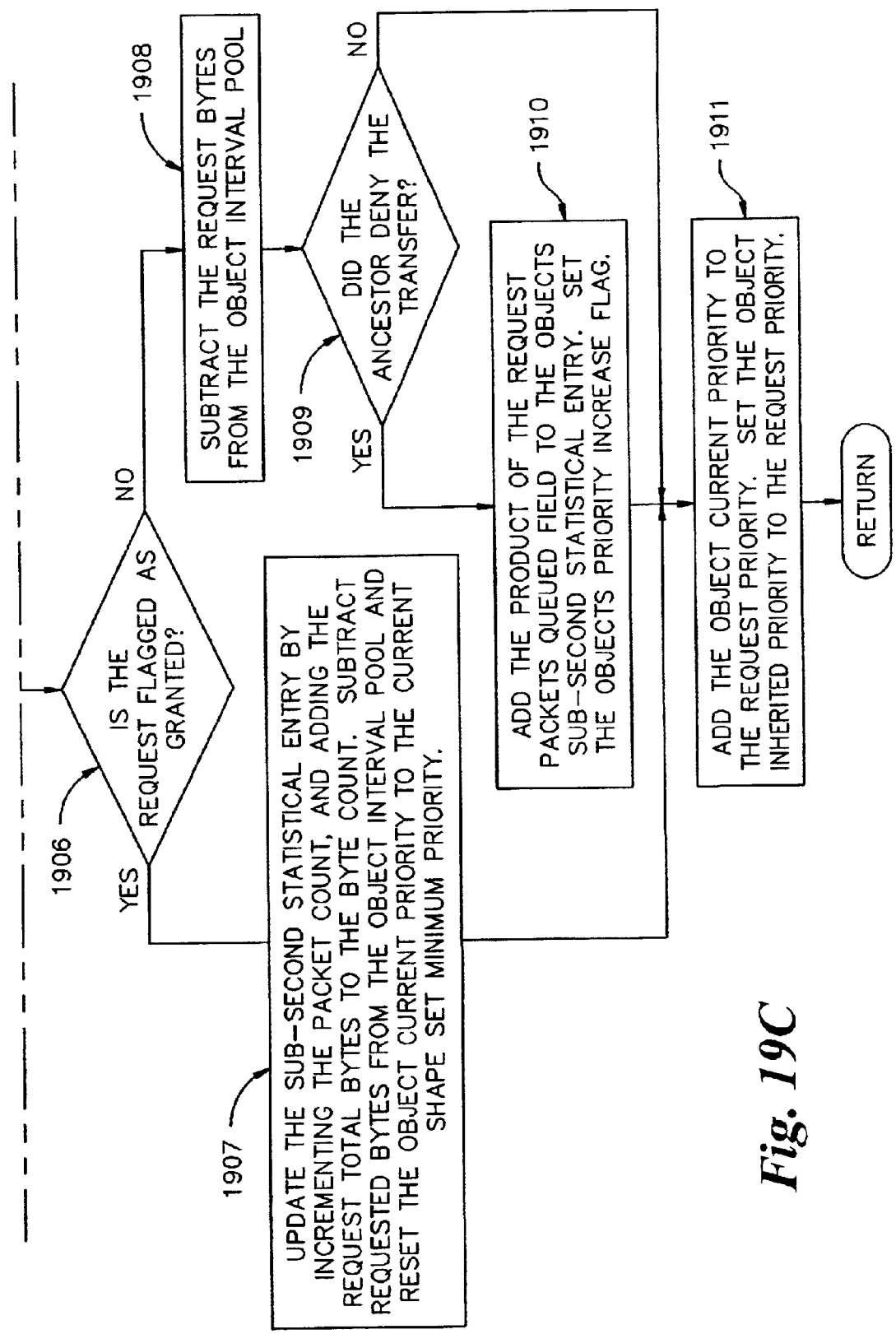

Continuing with FIG. 16 at 1601, the destination reserved fragment and packet length as described in the packet wrapper 808 are compared. If the destination reserved fragment is not less than the packet length, then the topology representation which contains the destination object has collectively granted permission for the traffic to pass, and processing resumes at 1606. Otherwise, at 1607, a request structure containing the following fields is created: (1) the destination object, (2) a true/false granted flag with an initial state of true, (3) a packets queued count, initialized to the number of packets currently in the destination object queue, and (4) a requested bytes field, initialized to the difference between the packet length and destination request fragment value. Next, at 1608, the update shape tree process (as shown in FIG. 17) is called for the destination object specified in the wrapper. Next, at 1609, the recursive request transfer process (as shown in FIG. 19) is called, passing the request structure. Next, at 1610, the request structure's requested bytes value is added to the packet wrapper's 808 destination reserved fragment value, and processing continues at 1606.

Continuing with FIG. 16 at 1606, if both the source reserved fragment and the destination reserved fragment contained in the packet wrapper 808 equal the packet length, a status is returned at 1611 indicating that packet transmission is granted; otherwise, the return status at 1612 indicates that permission is denied.

Referring to FIG. 17 at 1700, if the interval number stored in the state information 806 of the wrapper 808 indicates the current interval number (i.e., current periodic update interval sequence number), then the object and all of its ancestors have already been updated for the current interval, and processing concludes at 1710. Otherwise, the object and possibly its ancestors must be updated to the current interval. First, at 1701, the total periods counter of the object subsecond statistical entry 1001 is incremented. Next, at 1702, if the object has no ancestor (i.e., it is the logical interface object), the congested flag of the state information 806 is marked as not congested at 1703, and processing resumes at 1704.

Continuing with FIG. 17 at 1702, if the object does have an ancestor, the process of FIG. 17 is recursively called with the ancestor object at 1705. Upon return, at 1706, if the state of the ancestor according to the state information 806 is congested, then the current object is marked in the state information 806 as congested at 1707, and processing resumes at 1704. If at 1706 the ancestor is found not to be congested, and at 1708 the object interval pool from the state information 806 is non-zero, the object is marked as not congested at 1709. Processing resumes at 1704, where the current object undergoes the process shown in FIG. 18 before completing the processes at 1710.

Figure 18B:
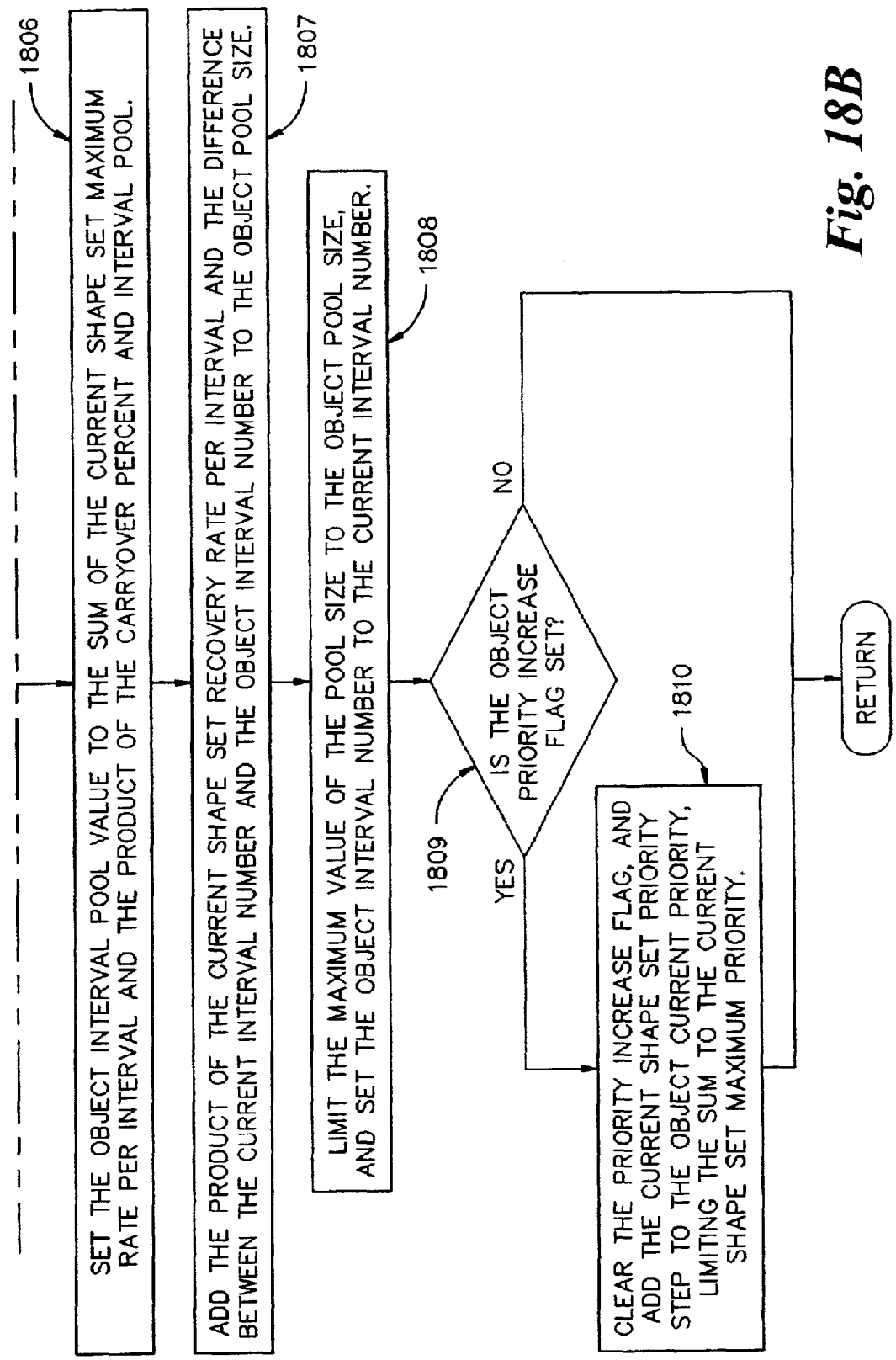
FIG. 18 is a flowchart of the shaping information update process for a single object in a topology representation in a bandwidth control system according to the present invention.

Referring to FIG. 18 at 1800, the current shape set value 1008 of the sub-second statistical entry 1001 is set to the current shape set index from the state information 806 of the object. Next, at 1801, if the object has an ancestor and its state is congested according to the state information 806 of the ancestor object, the object carry-over percent is set to 0% at 1802, and the congested shape set as indexed by the shape set index of the state information 806 is selected at 1803 as the current shape set for the object. Otherwise, at 1804, the object carry-over percent is increased by 2 points, up to a maximum total of 50%, and the normal shape set as indexed by the shape set index of the state information 806 is selected at 1805 as the current shape set for the object.

Continuing with FIG. 18 at 1806, the object interval pool value of the state information 806 is set to the sum of the object pool value multiplied by the carry-over percent, and the current shape set maximum rate (bytes) per periodic update interval. Next, at 1807, the difference between the current interval number and the object interval number from the state information 806 is multiplied by the recovery rate of the state information 806 in bytes per update interval and added to the object pool size. Next, at 1808, the object pool size is limited to the end range value 908 of the last of the object shaping sets, and the object interval number in the state information 806 is set to the current interval number.

Continuing with FIG. 18 at 1809, if the object priority increase flag in the state information 806 is true, then the priority increase flag is cleared at 1810, and the priority step value from the state information 806 is added to the object's current priority, within the limits of the maximum priority value for the current shape set.

Referring to FIG. 19 at 1900, if the requested bytes value in the request is greater than the object interval pool value from the state information 806, then at 1901 the requested bytes value is limited to the object interval pool value, the request granted flag is set to false, and the object is marked as congested in the state information 806. If, at 1902, the object has an ancestor, then at 1903 the object ancestor undergoes the process shown in FIG. 19, using the modified request structure. Upon return at 1904, if the ancestor is in the congested state, the current object state is set to congested at 1905, and the congested periods count 1006 of the object is incremented.

Continuing with FIG. 19 at 1906, if the request is flagged as granted, then, at 1907, the packet count field 1004 of the sub-second statistical entry is incremented, the requested bytes value from the request is added to the sub-second byte count field 1002, the requested bytes value is subtracted from the object interval pool, and the object's current priority is set to the minimum priority value of the object's currently selected shape set. If the request is flagged as denied, the requested bytes value is subtracted from the object's interval pool at 1908. If, at 1909, it was an ancestor object that denied the request, the number of packets queued field in the request is added to the congestion delays value 1007 in the sub-second statistical entry at 1910, and the object's priority increase flag is set in the state information 806.

Continuing with FIG. 19 at 1911, the object's current priority value is added to the request priority value. The request priority value, limited by the maximum priority value of the object's current shape set, is assigned to the inherited priority value in the state information 806.

Figures 20, 20A:
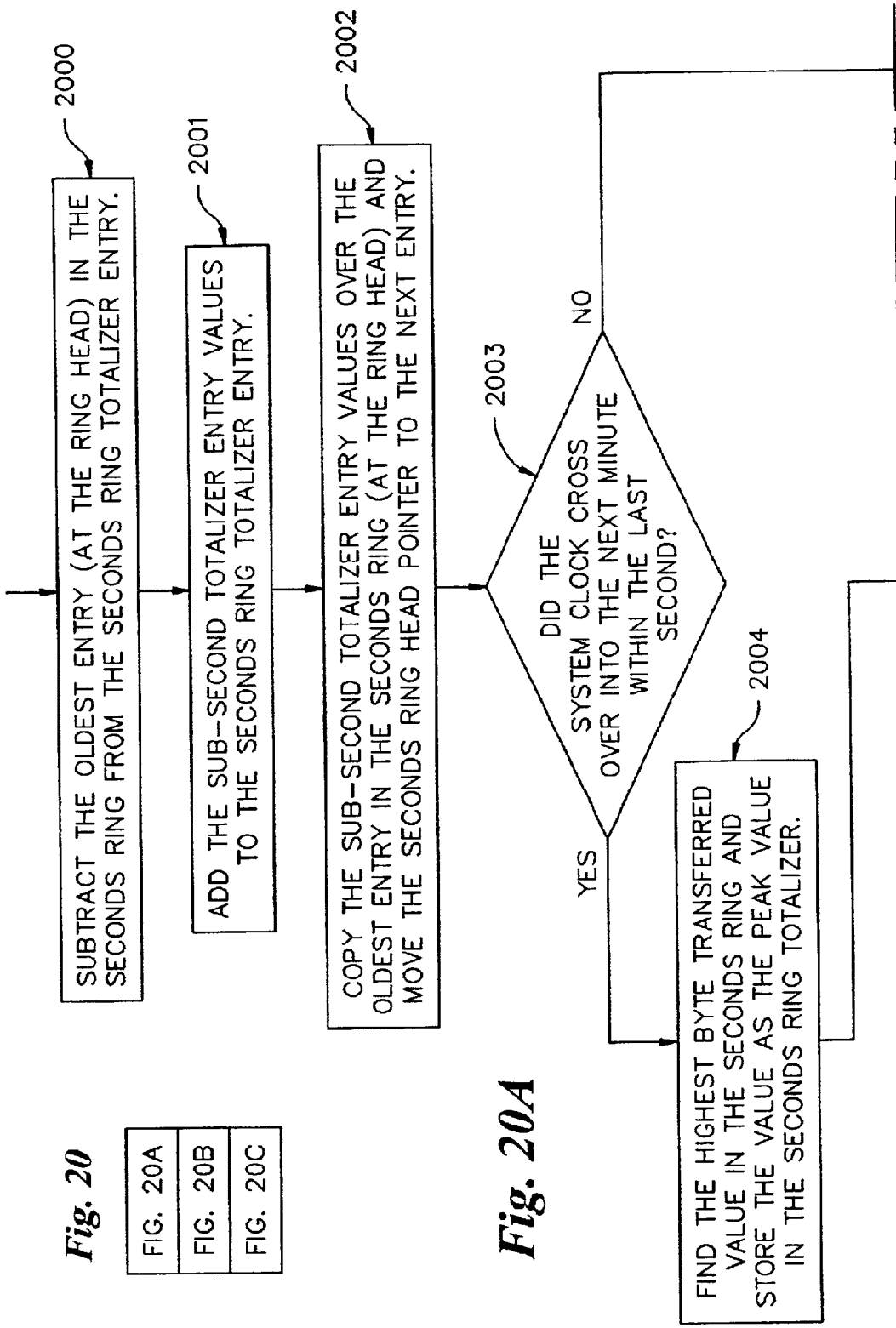
FIG. 20 is a flowchart of how statistical information is periodically processed for objects in the topology representation in a bandwidth control system according to the present invention.
Figure 20C:
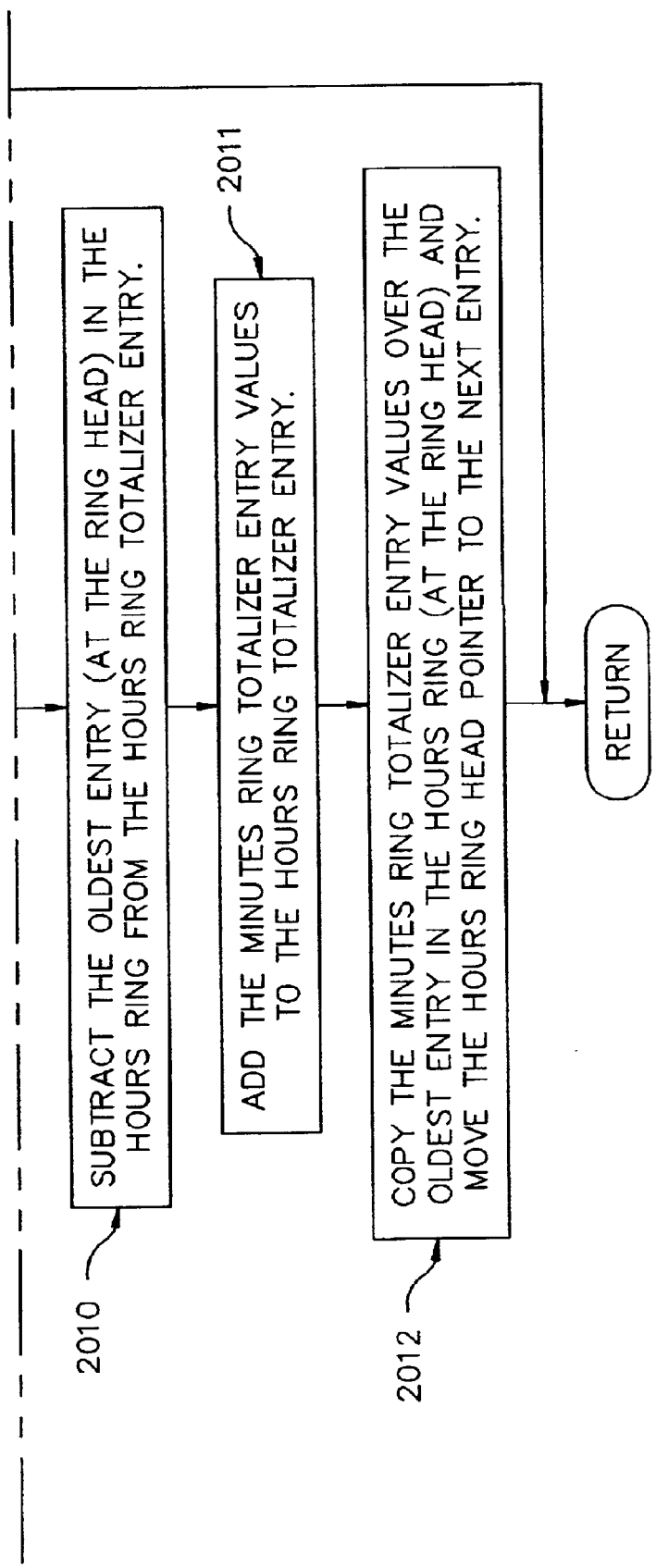

Referring to FIG. 20 at 2000, the oldest element of the minute statistics ring as pointed to by the list head pointer 1010 is subtracted from the totalizing entry 1013. Next, at 2001, the sub-second statistical entry 1001 is added to the totalizing entry 1013. Next, at 2002, the sub-second statistical entry 1001 overwrites the minute statistics ring entry pointed to by the list head pointer 1010.

Referring to FIG. 20 at 2003, if the host system clock has crossed into the next minute within the last second, the minute ring statistical entries are searched at 2004 for the highest bytes transferred value. Next, at 2005, the oldest element of the hour statistics ring as pointed to by the list head pointer 1011 is subtracted from the totalizing entry 1014. Next, at 2006, the minute ring totalizing entry 1013 is added to the totalizing entry 1014. Next, at 2007, the minute totalizing entry 1013, with its peak bytes field set to the value from 2004, overwrites the hour ring entry pointed to by the list head pointer 1011.

Referring to FIG. 20 at 2008, if the host system clock has crossed into the next hour within the last second, the hour ring statistical entries are searched at 2009 for the highest bytes transferred value. Next, at 2010, the oldest element of the day statistics ring as pointed to by the list head pointer 1012 is subtracted from the totalizing entry 1015. Next, at 2011, the hour ring totalizing entry 1014 is added to the totalizing entry 1015. Next, at 2007, the hour totalizing entry 1014, with its peak bytes field set to the value from 2009, overwrites the ring entry pointed to by the list head pointer 1012.

Figure 21B:
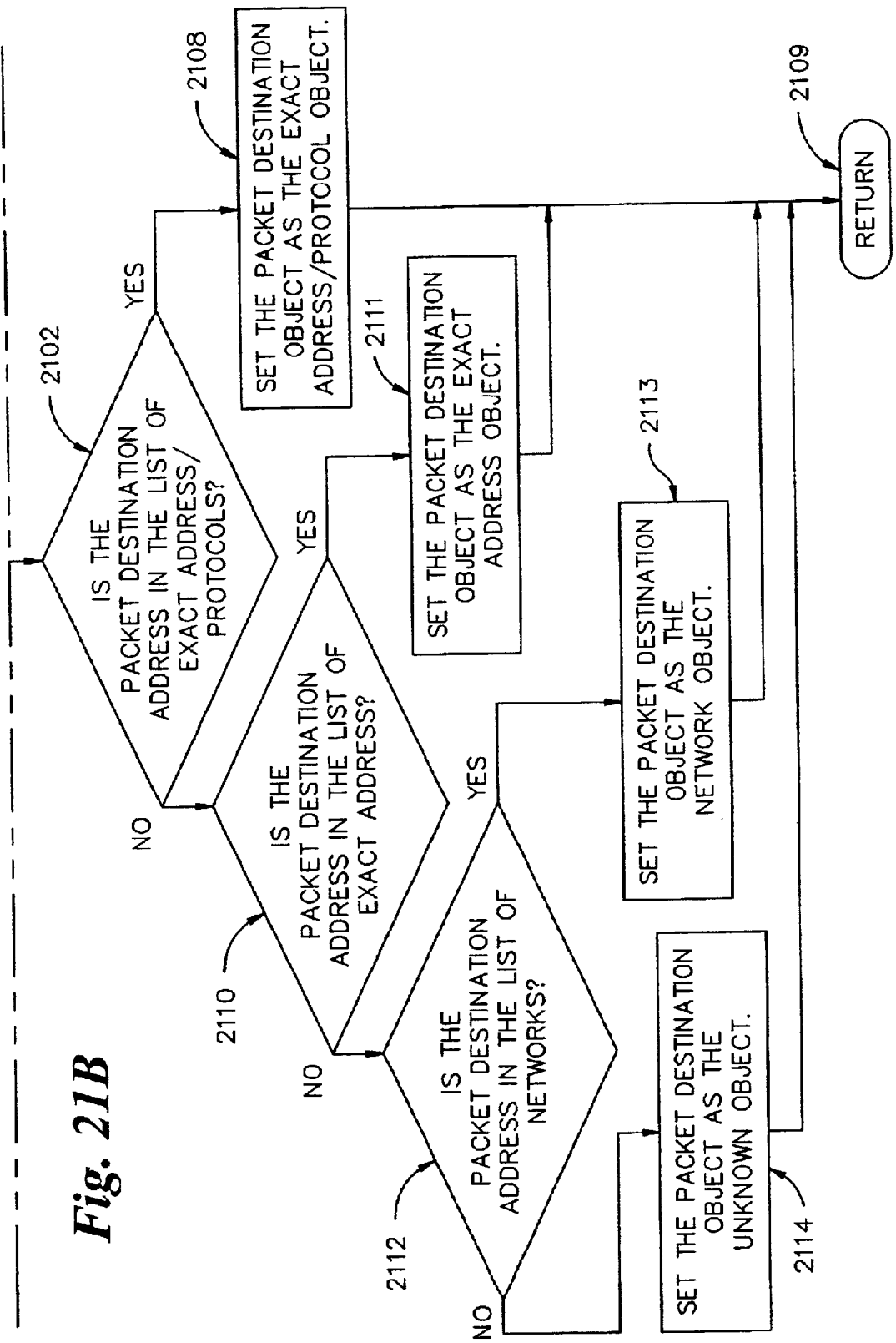
FIG. 21 is a flowchart of the address/protocol mapping process performed on each incoming packet in a bandwidth control system according to the present invention.
Figure 22B:
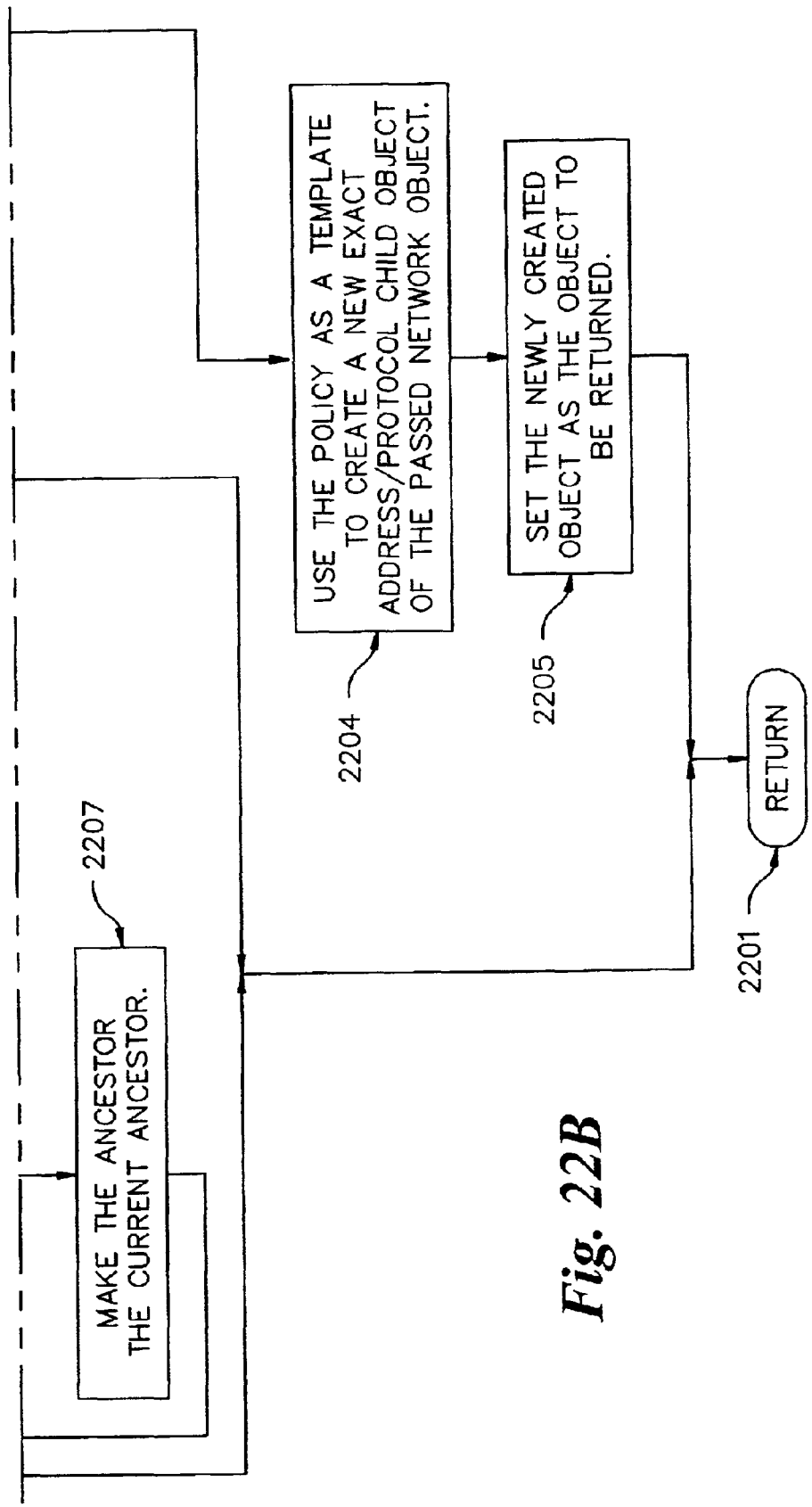
FIG. 22 is a flowchart of the automated discovery process that adds new objects to a topology representation with defaulted configuration information in a bandwidth control system according to the present invention.

Referring to FIG. 21 at 2100, only considering outbound objects of the topology and interface on which the packet was received, if the global address mapping table 405 has an entry which exactly matches the layer 3 address and application type of the source address, the object pointed to by the entry is established as the source address at 2101 for the packet, and processing continues at 2102. Otherwise, at 2103, if an entry which specifies the exact layer 3 address without a specific application type is found, the object pointed to by the entry is established as the source address at 2104 for the packet, and processing continues at 2102. Otherwise, at 2105, the first network in the set of networks ordered in ascending size which can contain the layer 3 address is sought, and, if found, the object pointed to by the entry is initially established as the source address for the packet, and the process shown in FIG. 22 is performed to attempt to add a newly created object which matches the source address which, if added, will be used in place of the object located at 2105, and processing continues at 2102. Otherwise, a default object is selected as the source address object at 2107. The default object may be the logical interface object or an object that represents traffic from an unknown source. Alternatively, the packet may be abandoned if desired.

Continuing with FIG. 21 at 2102, only considering inbound objects of the topology and interfaces other than the one on which the packet was received, if the global address mapping table 405 has an entry which exactly matches the layer 3 address and application type of destination address, the object pointed to by the entry is established as the destination address at 2108 for the packet, and processing continues at 2109. Otherwise, at 2110, if an entry which specifies the exact layer 3 address without a specific application type is found, the object pointed to by the entry is established as the destination address at 2111 for the packet, and processing continues at 2109. Otherwise, at 2112, the first network, recalling that networks are sorted within the table in ascending size, which can contain the layer 3 address is sought and if found the object pointed to by the entry is established as the destination address for the packet at 2113, and processing continues at 2109. Otherwise, a default object is selected as the destination address object at 2114. The default object may be the logical interface object or an object that represents traffic from an unknown source. Alternatively, the packet may be abandoned if desired.

Referring to FIG. 22 at 2200, if the network object passed has linkage information 901 that indicates that discovery of objects is not permitted, then no object will be returned at 2201. Otherwise, at 2202, the network object is made the current ancestor. If, at 2203, the current ancestor has a policy which matches the address/protocol type of the provided packet, then, at 2204, the policy is used as a template to create a descendent object of the network object with the source address/protocol of the trigging source packet from 2106, which is selected for return at 2205. If, at 2206, the current ancestor has no address/protocol policy which matches, and no ancestor, then no object will be returned at 2201. Otherwise, at 2207, the current ancestor is moved to the ancestor, and processing resumes at 2203.

Referring to FIG. 23, in an additional embodiment of the invention, the configuration information of 900 may also contain a set of rights 2300 that may be assigned to restrict the ability of a configuration user to view, modify, extend, or eliminate parts of a topology description. Such facilities are valuable when multiple parties (users) share the configuration and monitoring responsibility of a portion of the network topology.

Figure 24B:
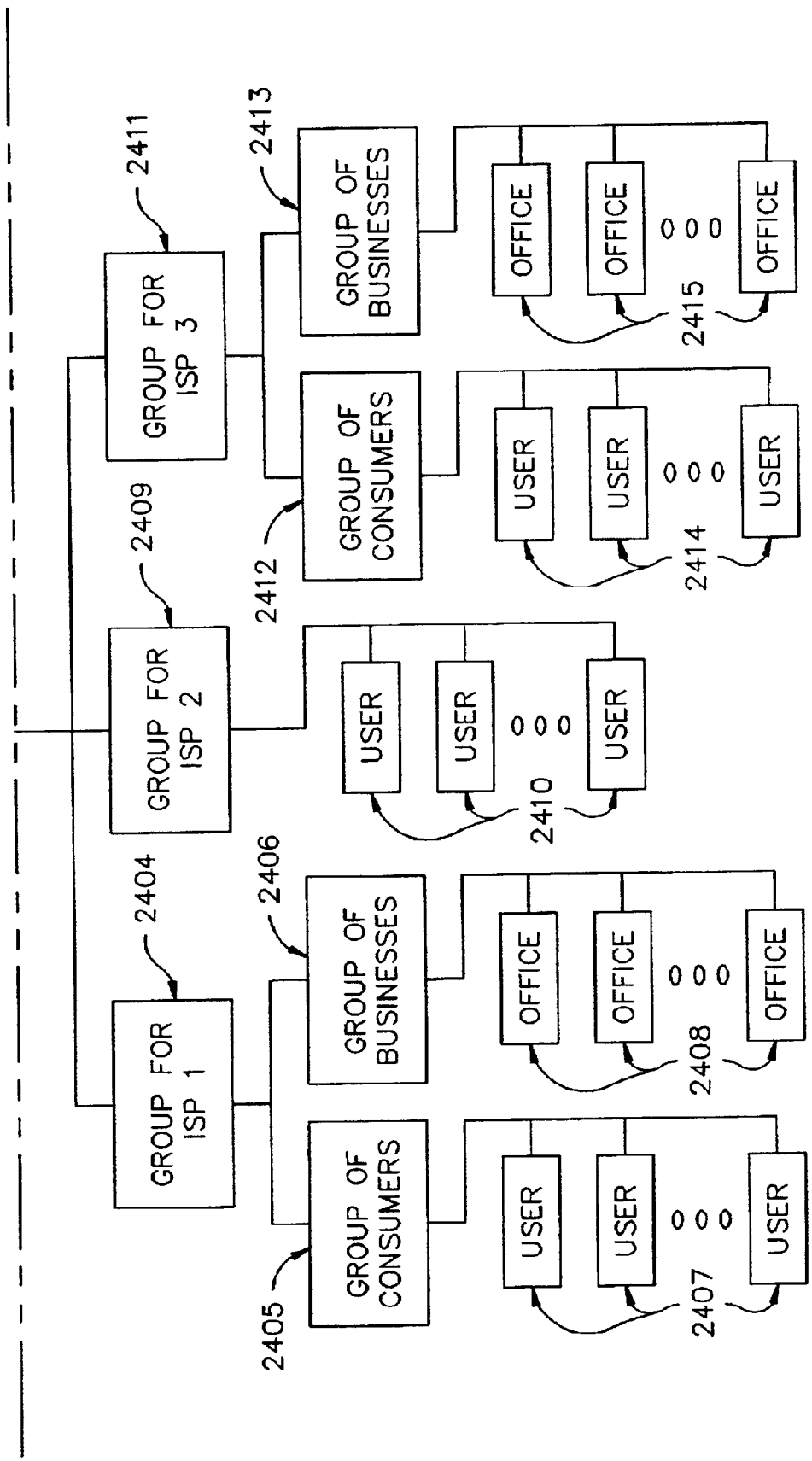
FIG. 24 is a block diagram of a network with shared topology that can be managed by a bandwidth control system according to the present invention.

Referring to FIG. 24, an example of this is a high-speed access system provided over cable television lines to consumers or small businesses. In this example, the cable operator provides high-speed last mile connectivity, and three separate Internet service providers (ISPs) provide connectivity from the cable head-end to both ISP specific and Internet content. The cable operator is likely to own the system traffic shaper of the present invention and the CATV distribution equipment and to have responsibility for ensuring connectivity between the customer and cable system head-end, but the connection from the head-end to the Internet backbone is provided through one of the three competing ISPs. Each of the ISPs is likely to enter into an agreement with the cable operator for a carriage fee based on the number of subscribers and/or the amount of the shared resources consumed. Further, the names, addresses, and traffic shaping settings of each ISP and its customers may be considered a trade secret which needs to be protected from the view of the other ISPs and the cable operator.

Returning to FIG. 23, to facilitate this shared access, each object in the topology representation has two sets of rights, one for the user that creates the object and another that the creator optionally grants to a second user. Among the rights are (1) to view the name of the object, (2) to view the network addresses of the object, (3) to view the shaping setting of the object, (4) permitting descendents of the object to be viewed, (5) changing the name of the object, (6) changing the network addresses of the object, (7) changing the shaping settings, (8) moving the object to a different location in the topology, (9) adding descendents of the object, and (10) deleting descendents of the object. If the secondary user for an object is anything other than ANYONE, owner right #4 (the right to view descendents) is automatically revoked.

Referring to FIG. 24, the following table indicates the users and rights assigned to each topology object in the example:

| Object | Owner | Owner Rights | Secondary | Secondary Rights |
|---|---|---|---|---|
| 2400 | CO | 1, 2, 3, 4, 5, 6, 7, 8, 9, 10 | ANYONE | 1, 2, 3, 4 |
| 2401 | CO | 1, 2, 3, 4, 5, 6, 7, 8, 9, 10 | ANYONE | 1, 2, 3, 4 |
| 2402 | CO | 1, 2, 3, 4, 5, 6, 7, 8, 9, 10 | ANYONE | 1, 2, 3, 4 |
| 2403 | CO | 1, 2, 3, 4, 5, 6, 7, 8, 9, 10 | ANYONE | 1, 2, 3, 4 |
| 2404 | CO | 1, 2, 3, 4, 5, 6, 7, 8 | ISP 1 | 1, 2, 3, 4, 9, 10 |
| 2405 | ISP 1 | 1, 2, 3, 4, 5, 6, 7, 8, 9, 10 | ANYONE | None |
| 2406 | ISP 1 | 1, 2, 3, 4, 5, 6, 7, 8, 9, 10 | ANYONE | None |
| 2407 | ISP 1 | 1, 2, 3, 4, 5, 6, 7, 8, 9, 10 | ANYONE | None |
| 2408 | ISP 1 | 1, 2, 3, 4, 5, 6, 7, 8, 9, 10 | ANYONE | None |
| 2409 | CO | 1, 2, 3, 4, 5, 6, 7, 8 | ISP 2 | 1, 2, 3, 4, 9, 10 |
| 2410 | ISP 2 | 1, 2, 3, 4, 5, 6, 7, 8, 9, 10 | ANYONE | None |
| 2411 | CO | 1, 2, 3, 4, 5, 6, 7, 8 | ISP 3 | 1, 2, 3, 4, 9, 10 |
| 2412 | ISP 3 | 1, 2, 3, 4, 5, 6, 7, 8, 9, 10 | ANYONE | None |
| 2413 | ISP 3 | 1, 2, 3, 4, 5, 6, 7, 8, 9, 10 | ANYONE | None |
| 2414 | ISP 3 | 1, 2, 3, 4, 5, 6, 7, 8, 9, 10 | ANYONE | None |
| 2415 | ISP 3 | 1, 2, 3, 4, 5, 6, 7, 8, 9, 10 | ANYONE | None |

Figure 25:
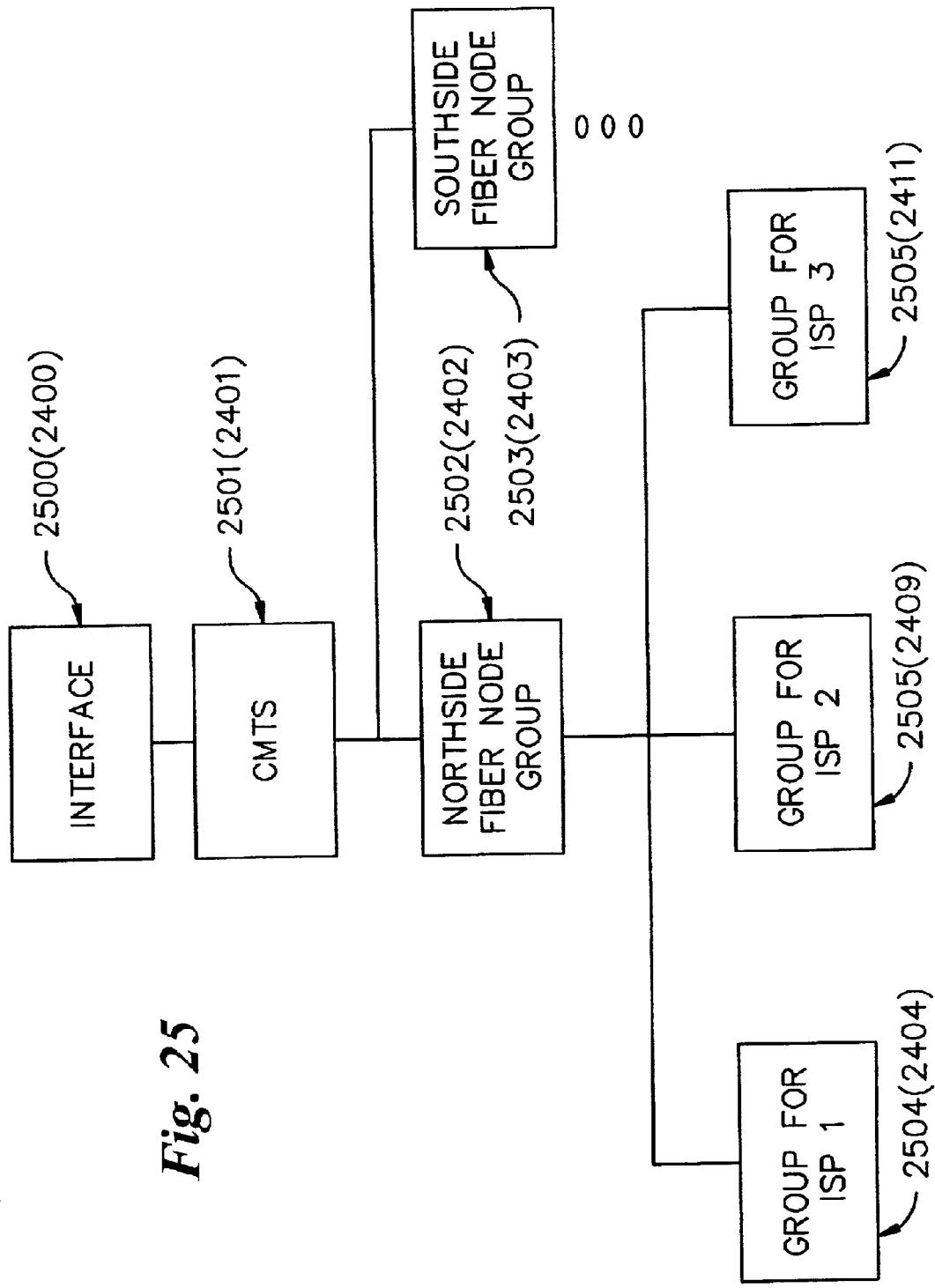
FIG. 25 is a block diagram of the network topology of FIG. 24 as seen by a first user of a bandwidth control system according to the present invention.

Referring to FIG. 25, the cable operator will have a limited view of the all of the objects in the system. In this example, none of the objects owned by any of the ISPs are visible to the cable operator.

Figure 26:
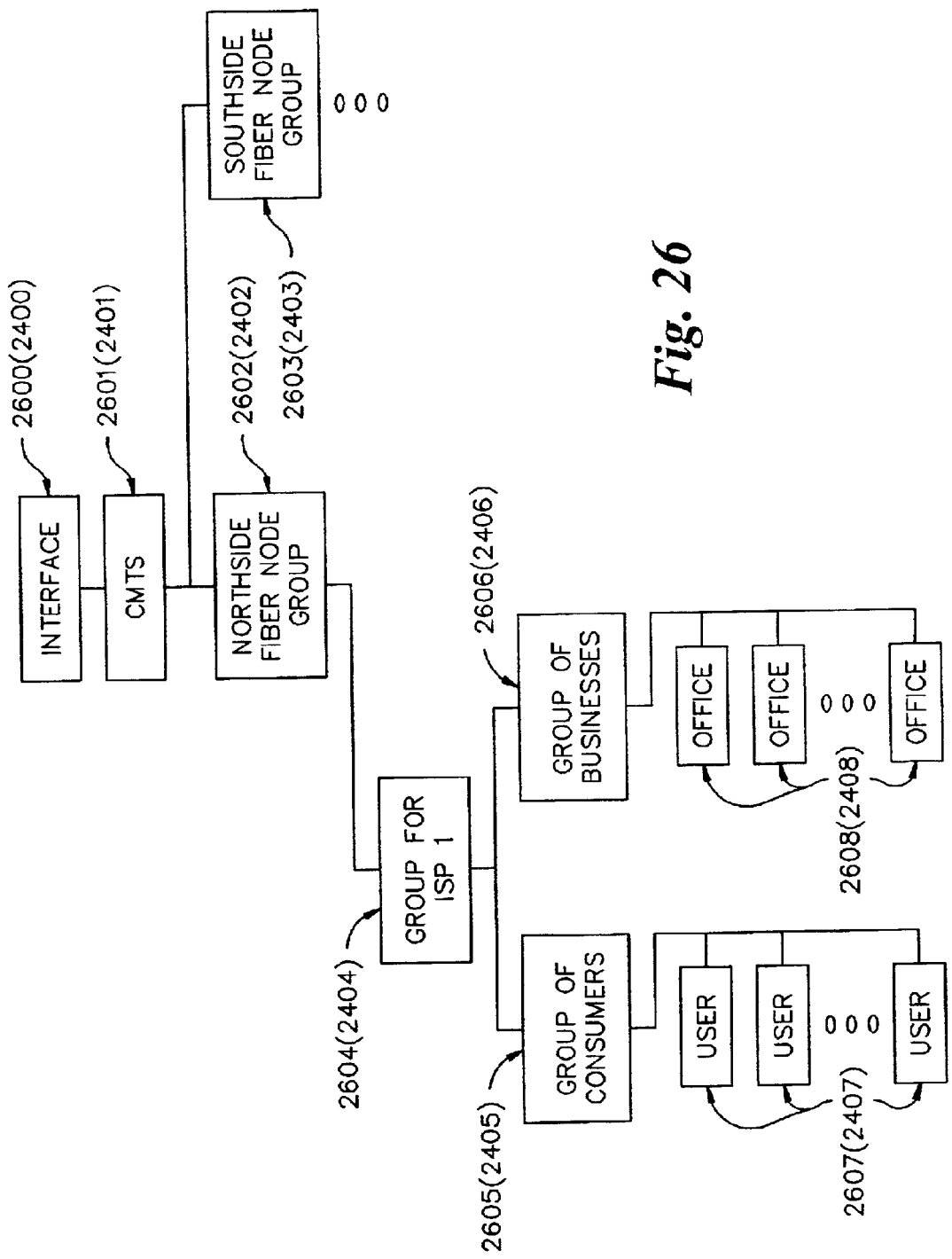
FIG. 26 is a block diagram of the network topology of FIG. 24 as seen by a second user of a bandwidth control system according to the present invention.

Referring to FIG. 26, ISP 1 sees only those objects owned by the ISP 2605, 2606, 2607, 2608, co-owned by the ISP 2604; and those owned by the cable operator by permitted view access the ISP as ANYONE 2600, 2601, 2602, 2603.

Figure 27:
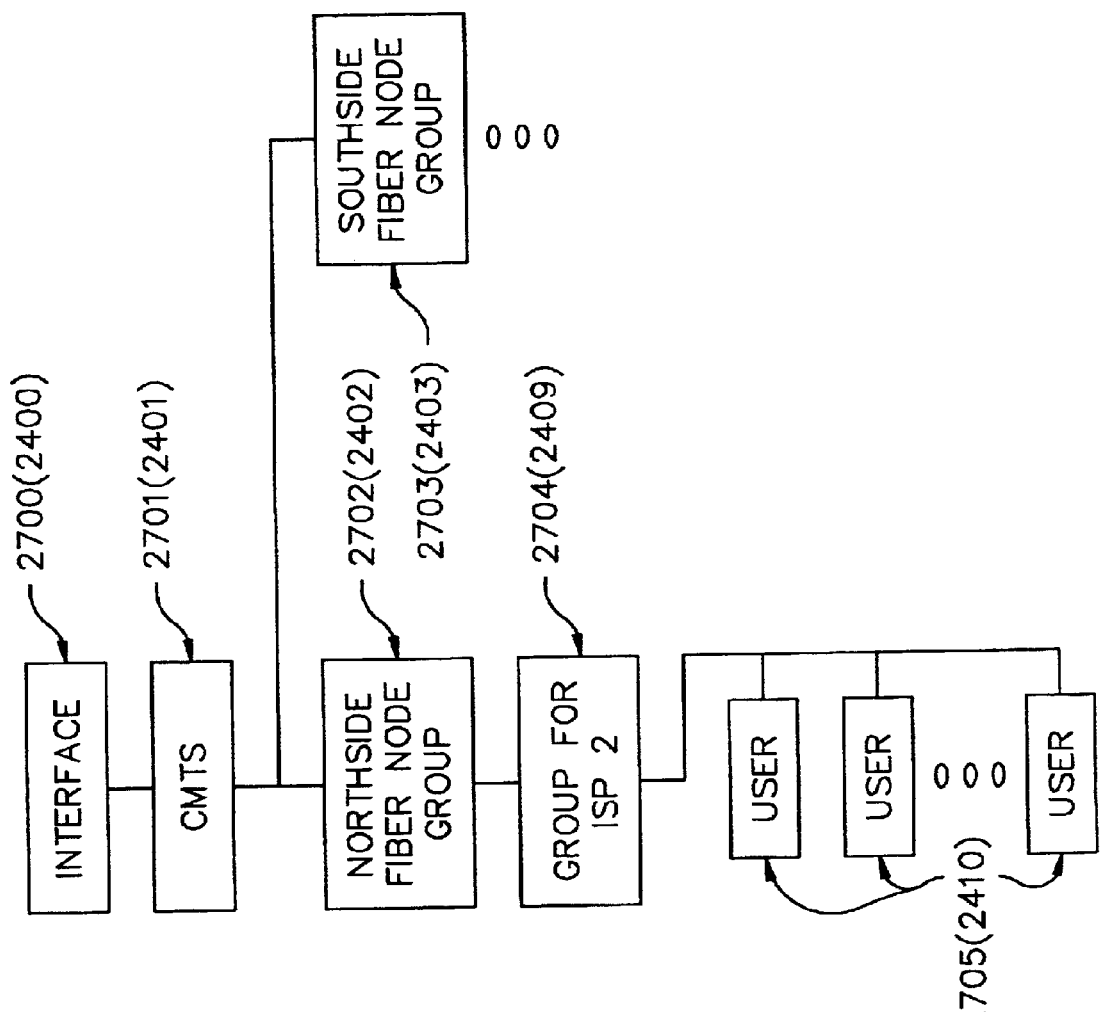
FIG. 27 is a block diagram of the network topology of FIG. 24 as seen by a third user of a bandwidth control system according to the present invention.

Referring to FIG. 27, ISP 2 sees only those objects owned by the ISP 2705, co-owned by the ISP 2704; and those owned by the cable operator by permitted view access the ISP as ANYONE 2700, 2701, 2702, 2703.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above, without departing from the broad inventive concept thereof. It is understood, therefore, that this invention is not limited to the particular embodiment disclosed, but it is intended to cover modifications within the spirit and scope of the present invention.

What is claimed is:

1. A bandwidth control system for a network, the network having a host computer that includes a first network interface and a second network interface, the bandwidth control system comprising:

a packet driver adapted to be executed on the host computer, the packet driver logically connected to the first network interface and the second network interface, the packet driver capturing packets received from the network on the first network interface; and a traffic shaper adapted to be executed on the host computer, the traffic shaper maintaining a topology representation of the network, the topology representation including one or more nodes that comprise a hierarchy of arbitrary physical and logical aggregation points that form a logical representation of the network and its underlying physical elements, the traffic shaper performing priority and packet rate metering functions on the captured packets to match a set of rate conditions unique to each node in the topology representation of the network, and returning the captured packets to the packet driver for transmission to the network on the second network interface.

2. The bandwidth control system of claim 1 wherein the nodes represent elements from the group consisting of interfaces, gateways, subnets, groups, addresses, protocols, routers or applications.

3. The bandwidth control system of claim 1 further comprising a configuration interface, wherein the configuration interface specifies operating parameters and the topology representation of the network to the traffic shaper.

4. The bandwidth control system of claim 3 wherein configuration interface further provides interactive operational and statistical information concerning the traffic shaper and the topology representation of the network maintained by the shaper.

5. The bandwidth control system of claim 1 wherein the traffic shaper maintains discrete topology representations of the network for both an inbound flow of traffic in the network and an outbound flow of traffic in the network.

6. The bandwidth control system of claim 5 wherein the traffic shaper utilizes independent rate conditions for the inbound flow of traffic in the network and the outbound flow of traffic in the network in performing priority and packet rate metering functions on the captured packets.

7. The bandwidth control system of claim 1 wherein the set of rate conditions unique to each node in the topology representation of the network includes a normal rate set, which is used when none of the node's ancestors are currently in a congested state, and a congested rate set, which is used when one or more of the node's ancestors is currently in the congested state.

8. A method of managing bandwidth in a network, the network having a host computer that includes a first network interface and a second network interface, the method comprising:
(a) constructing a topology representation of the network, the topology representation including one or more nodes that comprise a hierarchy of arbitrary physical and logical aggregation points that form a logical representation of the network and its underlying physical elements;
(b) receiving packets from the network on the first network interface;
(c) prioritizing and shaping the received packets to match a set of rate conditions unique to each node in the topology representation of the network; and
(d) transmitting the prioritized and shaped packets to the network on the second network interface.

9. The method of claim 8 wherein the nodes represent elements from the group consisting of interfaces, gateways, subnets, groups, addresses, protocols, routers or applications.

10. The method of claim 8 wherein in step (a) a topology representation of the network is constructed for both an inbound flow of traffic in the network and an outbound flow of traffic in the network.

11. The method of claim 10 wherein in step (c) independent rate conditions for the inbound flow of traffic in the network and the outbound flow of traffic in the network are used to prioritize and shape the received packets.

12. The method of claim 8 wherein step (c) further comprises:
(i) examining the source and destination addresses of the received packets;
(ii) pairing the received packets with shaping objects within the topology representation of the network; and
(iii) performing priority and packet rate metering functions on the received packets.

13. The method of claim 8 wherein the set of rate conditions unique to each node in the topology representation of the network includes a normal rate set, which is used when none of the node's ancestors are currently in a congested state, and a congested rate set, which is used when one or more of the node's ancestors is currently in the congested state.

14. An article of manufacture for managing bandwidth in a network, the network having a host computer that includes a first network interface and a second network interface, the article of manufacture comprising a computer-readable medium holding computer-executable instructions for performing a method comprising:
(a) constructing a topology representation of the network, the topology representation including one or more nodes that comprise a hierarchy of arbitrary physical and logical aggregation points that form a logical representation of the network and its underlying physical elements;
(b) receiving packets from the network on the first network interface;
(c) prioritizing and shaping the received packets to match a set of rate conditions unique to each node in the topology representation of the network; and
(d) transmitting the prioritized and shaped packets to the network on the second network interface.

15. The article of manufacture of claim 14 wherein the nodes represent elements from the group consisting of interfaces, gateways, subnets, groups, addresses, protocols, routers or applications.

16. The article of manufacture of claim 14 wherein in step (a) a topology representation of the network is constructed for both an inbound flow of traffic in the network and an outbound flow of traffic in the network.

17. The article of manufacture of claim 16 wherein in step (c) independent rate conditions for the inbound flow of traffic in the network and the outbound flow of traffic in the network are used to prioritize and shape the received packets.

18. The article of manufacture of claim 16 wherein step (c) further comprises:
(i) examining the source and destination addresses of the received packets;
(ii) pairing the received packets with shaping objects within the topology representation of the network; and
(iii) performing priority and packet rate metering functions on the received packets.

19. The article of manufacture claim 14 wherein the set of rate conditions unique to each node in the topology representation of the network includes a normal rate set, which is used when none of the node's ancestors are currently in a congested state, and a congested rate set, which is used when one or more of the node's ancestors is currently in the congested state.

* * * * *